(12) United States Patent
D'Oro et al.

(10) Patent No.: US 11,611,457 B2
(45) Date of Patent: Mar. 21, 2023

(54) DEVICE AND METHOD FOR RELIABLE CLASSIFICATION OF WIRELESS SIGNALS

(71) Applicant: Northeastern University, Boston, MA (US)

(72) Inventors: Salvatore D'Oro, Allston, MA (US); Tommaso Melodia, Newton, MA (US); Francesco Restuccia, Boston, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 17/650,686

(22) Filed: Feb. 11, 2022

(65) Prior Publication Data
US 2022/0255775 A1    Aug. 11, 2022

Related U.S. Application Data

(60) Provisional application No. 63/148,387, filed on Feb. 11, 2021.

(51) Int. Cl.
| | |
|---|---|
| *H04L 25/02* | (2006.01) |
| *H04L 1/00* | (2006.01) |
| *H04L 25/03* | (2006.01) |
| *H04L 5/00* | (2006.01) |

(52) U.S. Cl.
CPC ........ *H04L 25/0254* (2013.01); *H04L 1/0073* (2013.01); *H04L 5/0055* (2013.01); *H04L 25/03006* (2013.01); *H04L 2025/03464* (2013.01)

(58) Field of Classification Search
CPC ........... H04L 25/0254; H04L 25/03006; H04L 1/0073; H04L 2025/03464; H04L 5/0055
See application file for complete search history.

(56) References Cited

U.S. PATENT DOCUMENTS

| | | | |
|---|---|---|---|
| 9,113,353 B1 * | 8/2015 | Cotanis | ................. H04W 24/02 |
| 9,640,193 B2 * | 5/2017 | Kong | .................. G10L 21/0364 |
| 10,396,919 B1 * | 8/2019 | O'Shea | .................... G06N 3/08 |

(Continued)

OTHER PUBLICATIONS

Al-Shawabka, A. et al., "Exposing the Fingerprint: Dissecting the Impact of the Wireless Channel on Radio Fingerprinting," *Proc. of IEEE Conference on Computer Communications (INFOCOM)*, 2020.

(Continued)

*Primary Examiner* — James M Perez
(74) *Attorney, Agent, or Firm* — Hamilton, Brook, Smith & Reynolds, P.C.

(57) ABSTRACT

A machine learning (ML) agent operates at a transmitter to optimize signals transmitted across a communications channel. A physical signal modifier modifies a physical layer signal prior to transmission as a function of a set of signal modification parameters to produce a modified physical layer signal. The ML agent parses a feedback signal from a receiver across the communications channel, and determines a present tuning status as a function of the signal modification parameters and the feedback signal. The ML agent generates subsequent signal modification parameters based on the present tuning status and a set of stored tuning statuses, thereby updating the physical signal modifier to generate a subsequent modified physical layer signal to be transmitted across the communications channel.

32 Claims, 15 Drawing Sheets

(56) References Cited

U.S. PATENT DOCUMENTS

| | | | | |
|---|---|---|---|---|
| 10,541,765 | B1* | 1/2020 | O'Shea | H04B 17/3913 |
| 11,032,014 | B2* | 6/2021 | O'Shea | H04B 17/373 |
| 11,184,783 | B1* | 11/2021 | Melodia | H04W 12/79 |
| 11,219,387 | B2* | 1/2022 | Sun | A61B 5/1468 |
| 11,239,806 | B2* | 2/2022 | Shrivastava | H03F 3/005 |
| 11,271,699 | B1* | 3/2022 | Eyuboglu | H04W 80/02 |
| 11,404,165 | B2* | 8/2022 | Menichetti | G16H 50/50 |
| 11,483,042 | B2* | 10/2022 | Xue | H04B 7/0626 |
| 2009/0052514 | A1* | 2/2009 | Sampath | H04L 25/03006 375/232 |
| 2015/0289143 | A1* | 10/2015 | McHenry | H04W 64/006 455/67.13 |
| 2016/0127392 | A1* | 5/2016 | Baxley | G06F 16/951 726/23 |
| 2018/0084553 | A1* | 3/2018 | Boyer | H04L 5/0007 |
| 2018/0338310 | A1* | 11/2018 | Erceg | H04L 69/324 |
| 2019/0044874 | A1* | 2/2019 | Zhang | H04L 47/12 |
| 2019/0149274 | A1* | 5/2019 | Freda | H04W 72/0453 370/329 |
| 2020/0252838 | A1* | 8/2020 | Akdeniz | H04W 64/006 |
| 2020/0266910 | A1* | 8/2020 | O'Shea | G06N 3/08 |
| 2021/0091838 | A1* | 3/2021 | Bai | H04B 7/0639 |
| 2021/0111930 | A1* | 4/2021 | Davydov | H04B 17/345 |
| 2021/0119754 | A1* | 4/2021 | Tang | H04W 72/1268 |
| 2021/0194654 | A1* | 6/2021 | Zhang | H04L 5/0007 |
| 2021/0259639 | A1* | 8/2021 | Uvaydov | A61B 5/7225 |
| 2021/0273707 | A1* | 9/2021 | Yoo | H04L 1/0072 |
| 2021/0320825 | A1* | 10/2021 | Banuli Nanje Gowda | H04L 25/03968 |
| 2021/0357742 | A1* | 11/2021 | Restuccia | H04W 24/02 |
| 2022/0005337 | A1* | 1/2022 | Shin | H04L 5/0055 |
| 2022/0022044 | A1* | 1/2022 | D'Oro | H04W 4/021 |
| 2022/0052885 | A1* | 2/2022 | Luo | G06N 3/063 |
| 2022/0070867 | A1* | 3/2022 | Boyer | H04B 7/0691 |
| 2022/0094418 | A1* | 3/2022 | Polese | H04B 7/086 |
| 2022/0109532 | A1* | 4/2022 | Talarico | H04L 5/0055 |
| 2022/0167236 | A1* | 5/2022 | Melodia | H04W 28/0236 |
| 2022/0217035 | A1* | 7/2022 | Melodia | G06N 5/0055 |
| 2022/0255775 | A1* | 8/2022 | D'Oro | H04L 5/0055 |
| 2022/0287104 | A1* | 9/2022 | Jeon | G06N 20/00 |
| 2022/0311584 | A1* | 9/2022 | Behera | H04L 5/0044 |
| 2022/0343161 | A1* | 10/2022 | Restuccia | H04W 52/0258 |

OTHER PUBLICATIONS

Chen, M. et al., "Artificial Neural Networks-based Machine Learning for Wireless Networks: A Tutorial," *IEEE Communications Surveys & Tutorials*, vol. 21, No. 4, pp. 3039-3071 (2019).

Chiwewe, T. M. and G. P. Hancke, "Fast convergence cooperative dynamic spectrum access for cognitive radio networks," *IEEE Transactions on Industrial Informatics*, vol. 14, No. 8, pp. 3386-3394 (2017).

D'Oro, S. and F. Restuccia, "Can You Fix My Neural Network? Real-Time Adaptive Wavefoim Synthesis for Resilient Wireless Signal Classification," *Proceedings of IEEE International Conference on Computer Communications (IEEE INFOCOM)*, 2021.

Feng, M. and S. Mao, "Dealing with Limited Backhaul Capacity in Millimeter-Wave Systems: A Deep Reinforcement Learning Approach," *IEEE Communications Magazine*, vol. 57, No. 3, pp. 50-55 (2019).

Fujimoto, S. et al., "Addressing function approximation error in actor-critic methods," in *International Conference on Machine Learning*, pp. 1587-1596 (2018).

Jagannath, J. et al., "Machine Learning for Wireless Communications in the Internet of Things: A Comprehensive Survey," *Ad Hoc Networks*, vol. 93 (2019).

Jin, X. et al., "SpecGuard: Spectrum Misuse Detection in Dynamic Spectrum Access Systems," *IEEE Transactions on Mobile Computing*, vol. 17, No. 12, pp. 2925-2938 (2018).

Karra. K. et al., "Modulation Recognition Using Hierarchical Deep Neural Networks," in *Proc. of IEEE International Symposium on Dynamic Spectrum Access Networks (DySPAN)*, 2017.

Kulin, M. et al., "End-to-end learning from spectrum data: A deep learning approach for wireless signal identification in spectrum monitoring applications," *IEEE Access*, vol. 6, pp. 18484-18501 (2018).

LeCun, Y. et al., "Deep Learning," *Nature*, vol. 521, No. 7553, pp. 436-445 (2015).

Li, R. et al., "Deep Reinforcement Learning for Resource Management in Network Slicing," *IEEE Access*, vol. 6, pp. 74429-74441 (2018).

Lillicrap, T. P. et al., "Continuous control with deep reinforcement learning." in *International Conference on Learning Representations (ICLR)*, 2016.

Liu, J. et al., "DeepNap: Data-Driven Base Station Sleeping Operations Through Deep Reinforcement Learning," *IEEE Internet of Things Journal*, vol. 5, No. 6, pp. 4273-4282 (2018).

Luong. N. C. et al., "Applications of Deep Reinforcement Learning in Communications and Networking: A Survey," *IEEE Communications Surveys Tutorials*, vol. 21, No. 4, pp. 3133-3174 (2019).

Lv, L. et al. "Cognitive non-orthogonal multiple access with cooperative relaying: A new wireless frontier for 5g spectrum sharing," *IEEE Communications Magazine*, vol. 56, No. 4, pp. 188-195 (2018).

Mao, Q. et al., "Deep learning for intelligent wireless networks: A comprehensive survey," *Journal of Latex Class Files*, vol. 14, No. 8, pp. 1-28 (Jan. 2018).

Mnih, V. et al., "Playing Atari with Deep Reinforcement Learning," arXiv preprint arXiv:1312.5602, 2013.

Naparstek, O. and K. Cohen, "Deep Multi-user Reinforcement Learning for Distributed Dynamic Spectrum Access," *IEEE Transactions on Wireless Communications*, vol. 18, No. 1, pp. 310-323 (2019).

O'Shea, T. J. and J. Hoydis, "An Introduction to Deep Learning for the Physical Layer," *IEEE Transactions on Cognitive Communications and Networking*, vol. 3, No. 4, pp. 563-575 (2017).

O'Shea. T. J. et al., "Over-the-air deep learning based radio signal classification," *IEEE Journal of Selected Topics in Signal Processing*, vol. 12, No. 1, pp. 168-179 (2018).

Peng, L. et al., "Design of a Hybrid RF Fingerprint Extraction and Device Classification Scheme," *IEEE Internet of Things Journal*, vol. 6, No. 1, pp. 349-360 (2019).

Restuccia, F. and T. Melodia, "Big Data Goes Small: Real-Time Spectrum-Driven Embedded Wireless Networking Through Deep Learning in the RF Loop," *Proc. of IEEE Conference on Computer Communications (INFOCOM)*, 2019.

Restuccia, F. and T. Melodia, "DeepWiERL: Bringing Deep Reinforcement Learning to the Internet of Self-Adaptive Things," *Proc. of IEEE Conference on Computer Communications (INFOCOM)*, 2020.

Restuccia, F. et al., "DeepRadioID: Real-Time Channel-Resilient Optimization of Deep Learning-based Radio Finger-printing Algorithms," in *Proc. of the ACM International Symposium on Mobile Ad Hoc Networking and Computing (ACM MobiHoc)*, 2019.

Sankhe, K. et al., "ORACLE: Optimized Radio clAssification through Convolutional neuraL nEtworks," in *Proc. of IEEE Conference on Computer Communications (INFOCOM)*, 2019.

Shokri-Ghadikolaci, H. et al., "Spectrum sharing in mmwavc cellular networks via cell association, coordination, and beamforming," *IEEE Journal on Selected Areas in Communications*, vol. 34, No. 11, pp. 2902-2917 (2016).

Sun, Y. et al., "Deep Reinforcement Learning-Based Mode Selection and Resource Management for Green Fog Radio Access Networks," *IEEE Internet of Things Journal*, vol. 6, No. 2, pp. 1960-1971 (2019).

Vazquez, M. A. et al., "Hybrid analog-digital transmit beamforming for spectrum sharing backhaul networks," *IEEE transactions on signal processing*, vol. 66, No. 9, p. 2273 (2018).

Wang, F. et al., "Intelligent Edge-Assisted Crowdcast with Deep Reinforcement Learning for Personalized QoE," *Proc. of IEEE Conference on Computer Communications (INFOCOM)*, 2019.

Wang, F. et al., "Intelligent Video Caching at Network Edge: A Multi-Agent Deep Reinforcement Learning Approach," *Proc. of IEEE Conference on Computer Communications (INFOCOM)*, 2020.

(56) References Cited

OTHER PUBLICATIONS

Wang, H. et al., "Optimizing Federated Learning on Non-IID Data with Reinforcement Learning," *Proc. of IEEE Conference on Computer Communications (INFOCOM)*, 2020.

Wang, H. et al., "Rldish: Edge-Assisted QoE Optimization of HTTP Live Streaming with Reinforcement Learning," *Proc. of IEEE Conference on Computer Communications (INFOCOM)*, 2020.

Wang, S. et al., "Deep Reinforcement Learning for Dynamic Multichannel Access in Wireless Networks," *IEEE Transactions on Cognitive Communications and Networking*, vol. 4, No. 2, pp. 257-265 (2018).

Wang, Z. et al., "Handover Control in Wireless Systems via Asynchronous Multiuser Deep Reinforcement Learning," *IEEE Internet of Things Journal*, vol. 5, No. 6, pp. 4296-4307 (2018).

Xing, Y. et al., "On Radio Frequency Fingerprint Identification for DSSS Systems in Low SNR Scenarios," *IEEE Communications Letters*, vol. 22, No. 11, pp. 2326-2329 (2018).

Xiong, W. et al., "Robust and Efficient Modulation Recognition Based on Local Sequential IQ Features," in Proc, of IEEE Conference on Computer Communications (INFOCOM), 2019.

Yaqoob, I. et al., "Internet of Things Architecture: Recent Advances, Taxonomy, Requirements, and Open Challenges," *IEEE Wireless Communications*, vol. 24, No. 3, pp. 10-16 (2017) (Abstract Only).

Yu, Y et al., "Deep-Reinforcement Learning Multiple Access for Heterogeneous Wireless Networks," *IEEE Journal on Selected Areas in Communications*, vol. 37, No. 6, pp. 1277-1290 (Jun. 2019).

Zhang, L. et al., "Deep reinforcement learning-based modulation and coding scheme selection in cognitive heterogeneous networks," *IEEE Transactions on Wireless Communications*, vol. 18, No. 6, pp. 3281-3294 (2019).

Zheleva, M. et al., "AirView: Unsupervised Transmitter Detection for Next Generation Spectrum Sensing," in *Proc. of IEEE Conference on Computer Communications* (INFOCOM), 2018.

Zheng, T. et al., "FID: Fuction Modeling-based Data-Independent and Channel-Robust Physical-Layer Identification ," in *Proc. of IEEE Conference on Computer Communications (INFOCOM)*, 2019.

\* cited by examiner

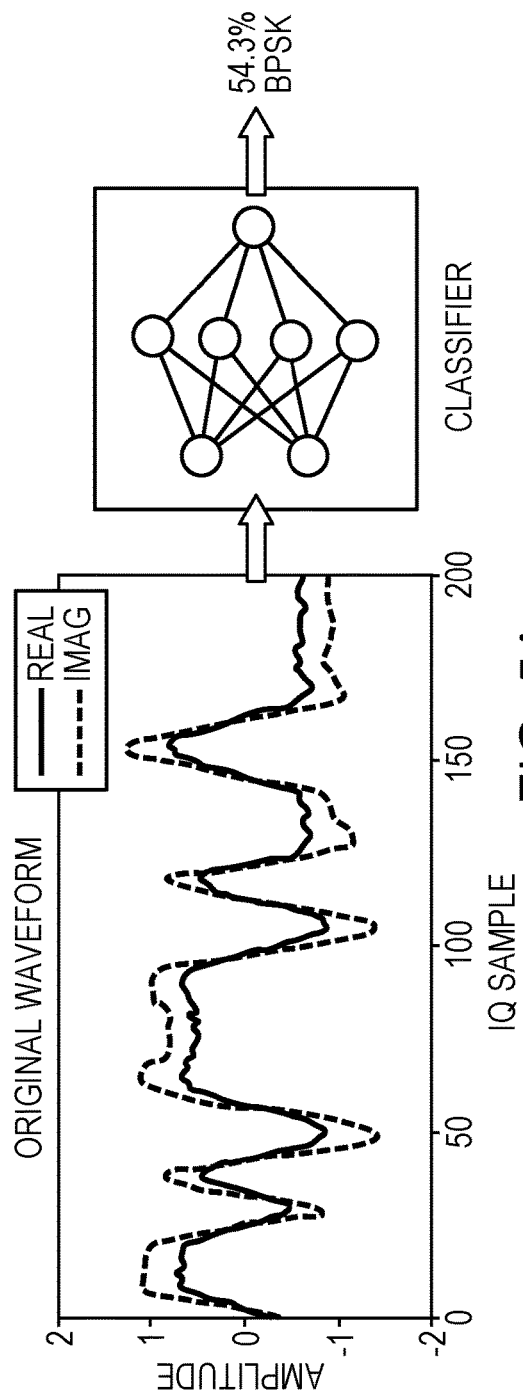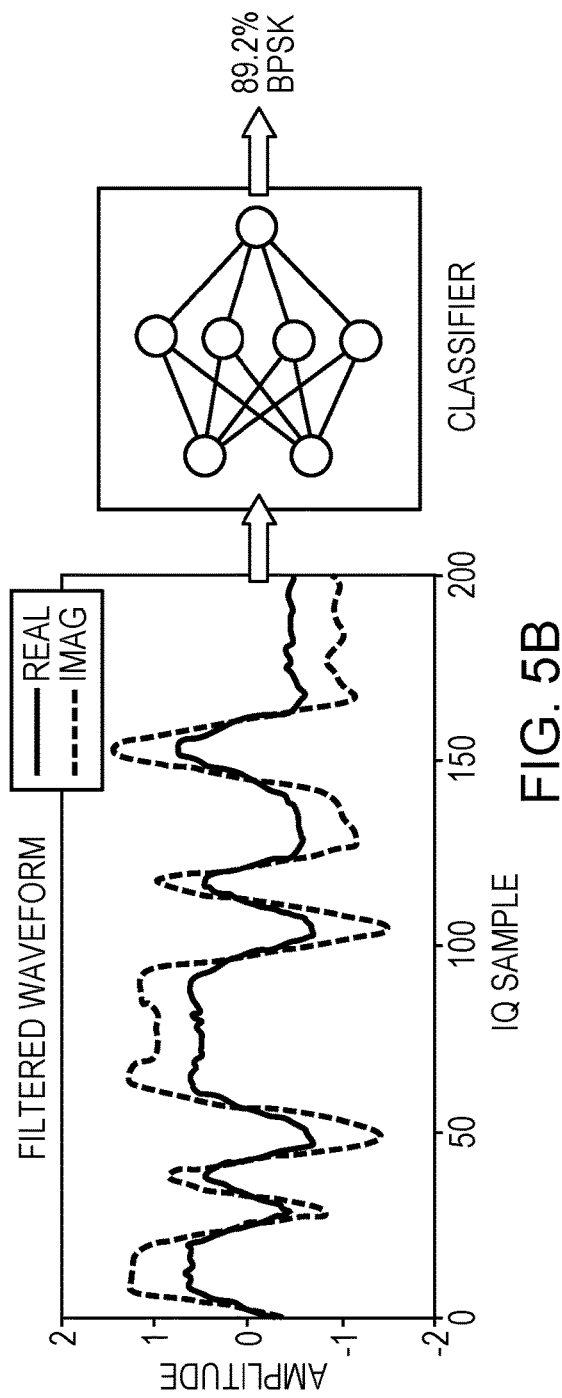
FIG. 5A
FIG. 5B

DEVICE AND METHOD FOR RELIABLE CLASSIFICATION OF WIRELESS SIGNALS

RELATED APPLICATION

This application claims the benefit of U.S. Provisional Application No. 63/148,387, filed on Feb. 11, 2021. The entire teachings of the above application are incorporated herein by reference.

GOVERNMENT SUPPORT

This invention was made with government support under Grant Nos. 1937500 and 1923789 awarded by the National Science Foundation, and HR0011-20-9-0055 awarded by DARPA. The government has certain rights in the invention.

BACKGROUND

The Internet of Things (IoT) encompasses a variety of different devices that are capable of connecting to a network to provide various communication functions. Such devices include televisions, speakers, wearables such as watches and fitness trackers, home appliances such as refrigerators, phones, tablet devices, fire alarms, security systems, and thermostats. An important challenge in the IoT is providing scalable, reliable and energy-efficient authentication mechanisms. However, most existing authentication mechanisms are not well-suited to the IoT because they are heavily based on cryptography-based algorithms and protocols, which are often too computationally expensive to be run on smaller, energy-constrained IoT devices.

To address this challenge, a number of techniques based on radio fingerprinting have been presented. A core observation behind radio fingerprinting is that wireless devices usually exhibit small-scale hardware-level imperfections typically found in off-the-shelf RF circuitry, such as phase noise, I/Q imbalance, frequency and sampling offset, and harmonic distortions. Because of these impairments, a number of wireless devices operating on the same baseband signal will necessarily transmit two slightly different RF waveforms. A "fingerprint" of the wireless device can be obtained by estimating the RF impairments on the received waveform and associating them to a given device.

SUMMARY

Example embodiments include a communications device comprising a transmitter, a physical signal modifier, and a machine learning (ML) agent. The transmitter may be configured to generate a physical layer signal to be transmitted across a communications channel. The physical signal modifier may be configured to modify the physical layer signal prior to transmission as a function of a first set of signal modification parameters to produce a modified physical layer signal. The ML agent may be configured to parse a feedback signal from a receiver across the communications channel, the feedback signal being a function of the modified physical layer signal. The ML agent may then determine a present tuning status, the present tuning status being a function of 1) the first set of signal modification parameters and 2) the feedback signal. The ML agent may generate a second set of signal modification parameters based on the present tuning status and a set of stored tuning statuses. The ML agent may then update the physical signal modifier to implement the second set of signal modification parameters to produce a subsequent modified physical layer signal to be transmitted across the communications channel.

In an example operation, the transmitter may receive the feedback signal from a receiver device via the communications channel, and, in response, may generate updated signal modification parameters for the physical signal modifier. The transmitter may then generate the physical layer signal. The physical signal modifier, in turn, may receive and modify the physical layer signal as a function of the aforementioned signal modification parameters. The communications interface may then transmit the resulting modified physical layer signal as a transmitted signal across the communications channel, where it is received by an interface at the receiver device. After a period of time following processing of the received physical layer signal, the receiver device may return a subsequent feedback signal, which is received by the interface. The transmitter device may then repeat the process beginning with generating updated signal modification parameters for the physical signal modifier, and then modifying subsequent physical layer signals under the updated parameters.

An example operation by the ML agent may include some or all of the following features. The interface may receive the feedback signal from the receiver and provide the feedback signal (or a representation thereof) to the ML agent. The ML agent may parse the feedback signal, which may be responsive to a previous modified physical layer signal that was transmitted as a transmitted signal across the communications channel. For example, if the processor includes a classifier configured to classify one or more characteristics of the received signal, then the feedback signal may represent a predicted class or a softmax of the modified physical layer signal output by a signal classifier at the receiver device. The predicted class may identify one or more characteristics of the modified physical layer signal, such as a communications protocol, modulation format, frequency band, communications technology, and encryption scheme. The feedback signal may also represent a predicted modulation class or a predicted radio frequency (RF) fingerprint of the modified physical layer signal output by a signal classifier at the receiver. Alternatively, the feedback signal may represent an error rate output by the receiver, the error rate indicating a rate of error in decoding the modified physical layer signal. Thus, the transmitter device may utilize the feedback signal from the receiver device in the absence of a classifier at the receiver device.

The ML agent may then determine a present tuning status as a function of the present set of signal modification parameters (e.g., the parameters used to generate the previous modified physical layer signal) and the feedback signal. As described below, the tuning status may be a tuple including values representing the first set of signal modification parameters and the feedback signal.

The ML agent may generate a subsequent set of signal modification parameters based on the present tuning status and a set of stored tuning statuses that are stored at the status data store. The ML agent may have previously undergone a training process to generate the stored tuning statuses via a training process, as described in further detail below. Such training may involve the ML agent incorporate a range of noise signals into a physical layer signal during the training process, thereby producing stored tuning statuses that correspond to a range of different channel conditions to inform the ML agent when determining the signal modification parameters. As described above, if the receiver device includes a classifier, then the present tuning status may be a function of a feedback signal that indicates a predicted class, softmax or other result output by the classifier. However, the feedback signal may be limited to such high-level classification results. Thus, the ML agent may to generate the subsequent set of signal modification parameters absent an indication of model parameters or weight values implemented by a signal classifier at the receiver.

Lastly, the ML agent may update the physical signal modifier to implement the subsequent set of signal modification parameters to produce a subsequent modified physical layer signal to be transmitted across the communications channel as the transmitted signal. For example, the physical signal modifier may include a FIR filter configured to modify the physical layer signal by modifying a set of FIR taps, and the modification parameters may specify the modified FIR taps. The ML agent may also determine a subsequent tuning status that indicates the second set of signal modification parameters, and then update the data store to include the subsequent tuning status, thereby developing the reference database for future operations. The process may be repeated continuously or periodically in response to the transmitter device receiving subsequent feedback signals from the receiver device.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 5A-B are diagrams illustrating classification of modulated signals.

DETAILED DESCRIPTION

Figure 1:
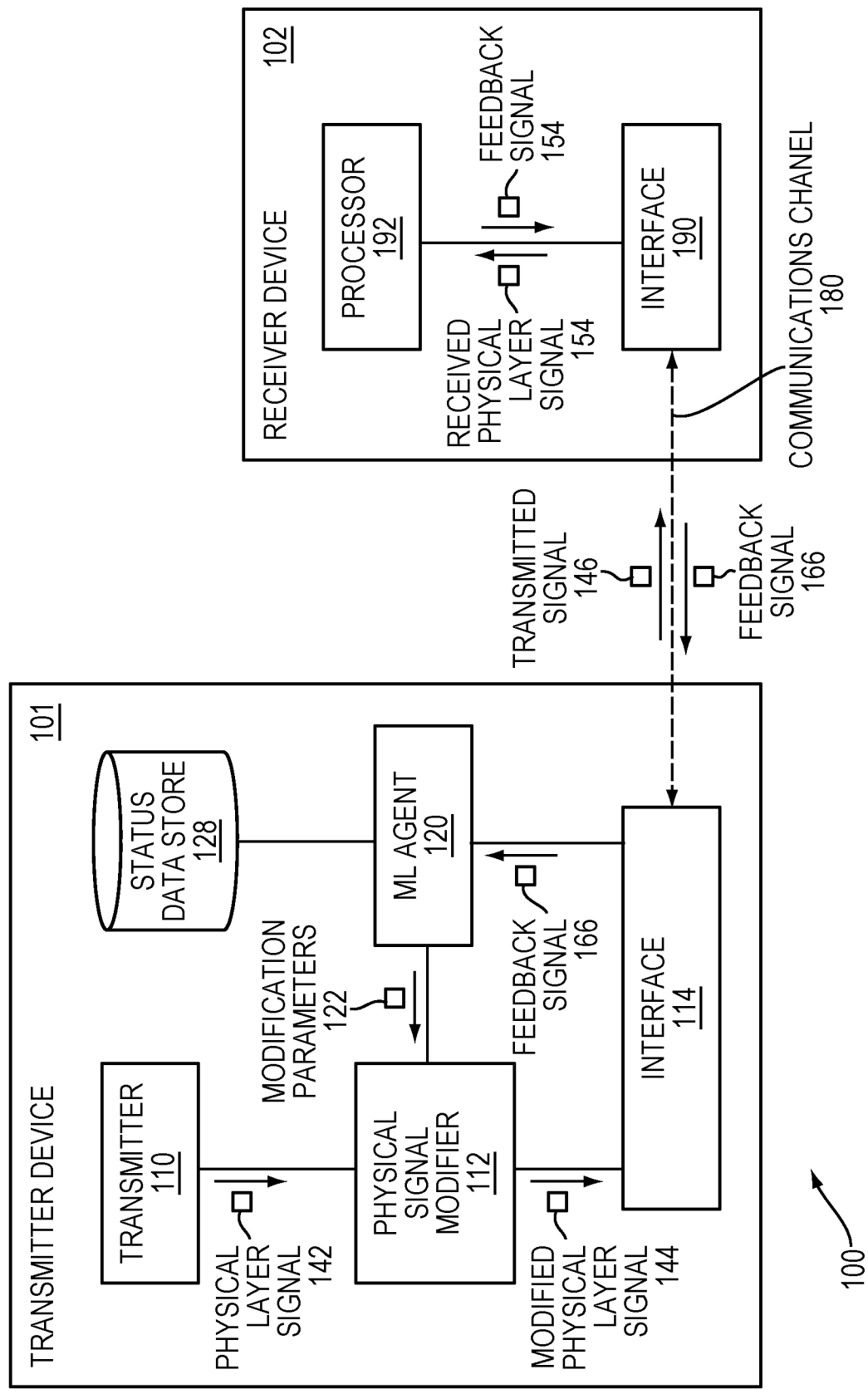
FIG. 1 is a block diagram of a communications system in one embodiment.

A description of example embodiments follows.

The rise of the Internet of Things (IoT) and 5th generation (5G) networks will mark an era where several billion people and devices will ubiquitously request services using a multitude of networking protocols and architectures. The inevitable outcome will be a crowded spectrum (especially in the sub-6 GHz regime) where diverse technologies coexist and share the same spectrum bands. To solve this problem (known as spectrum crunch) the networking community is undertaking a radical paradigm shift where inflexible architectures are being left behind in favor of "smart" transceivers that utilize spectrum resources more efficiently by reconfiguring networking parameters and transmission strategies in real time. Dynamic spectrum access, spectrum sensing, and reconfigurable transceivers are just a few examples of technologies that will become compelling necessities.

Being able to classify phenomena without explicit modeling, deep learning (DL) architectures, and in particular convolutional neural networks (CNNs), have experienced a surge of interest from the community over the last few years as flexible and efficient tools to perform a plethora of networking-related tasks—such as modulation classification, radio fingerprinting, and real-time radio-frequency (RF) front-end reconfiguration. For this reason, DL systems are among the most promising tools to develop and deploy the next-generation of intelligent and adaptive wireless networks.

The majority of the above solutions operate in the complex-domain and can be generalized as wireless signal classification (WSC) problems, where waveforms coming from the RF front-end are fed to, and classified by, a neural network. Most of the existing research has focused on demonstrating the effectiveness of WSC in classifying different spectrum phenomena. For example, DL models have been shown to achieve on the average about 20% higher classification accuracy than legacy learning models. Moreover, DL can achieve 27% improvement over traditional Machine Learning (ML) in large-scale radio fingerprinting. However, research has unveiled that the time-varying nature of the wireless channel (e.g., fading, mobility, interference) can have detrimental consequences to the accuracy of the model when tested with samples collected in different times than when the model was trained.

Due to the sheer scale of the IoT and 5G, the wireless spectrum is becoming severely congested. For this reason, wireless devices will need to continuously adapt to current spectrum conditions by changing their communication parameters in real-time. Therefore, WSC will become a compelling necessity to decode fast-changing signals from dynamic transmitters. Thanks to its capability of classifying complex phenomena without explicit mathematical modeling, DL has been demonstrated to be a key enabler of WSC. Although DL can achieve a very high accuracy under certain conditions, recent research has unveiled that the wireless channel can disrupt the features learned by the DL model during training, thus drastically reducing the classification performance in real-world live settings. Because retraining classifiers is cumbersome after deployment, existing work has leveraged the usage of carefully-tailored Finite Impulse Response (FIR) filters that, when applied at the transmitter's side, can restore the features that are lost because of the channel actions, such as waveform synthesis. However, these approaches compute FIRs using offline optimization strategies, which limits their efficacy in highly-dynamic channel settings.

Example embodiments, described below, may provide a Deep Reinforcement Learning (DRL)-based framework for channel-resilient adaptive waveform synthesis. A transmitter device can adapt to new and unseen channel conditions by optimally computing through DRL the FIRs in real time. The transmitter includes a machine learning (ML) agent, such as a DRL agent. The ML agent may have an architecture based upon the Twin Delayed Deep Deterministic Policy Gradients (TD3), which requires minimal feedback from the receiver and explores a continuous action space for best performance. Example embodiments have been extensively evaluated on two well-known datasets with an extensive number of channels. The real-time latency of an example transmitter has also been evaluated. Results show that example embodiments can increase the accuracy up to 4.1× when no waveform synthesis is performed, by 1.9× with respect to existing work, and can compute new actions within 41 µs.

FIG. 1 is a block diagram of a communications system 100 in one embodiment. The system 100 includes a transmitter device 101 and a receiver device 102 communicatively coupled via a communications channel 180. One or both of the devices 101, 102 may be implemented in an IoT device and/or a device in communication with an IoT device. For example, the transmitter device 101 may be a component of an IoT device such as a mobile phone, and the receiver device 102 may be a component of a wireless access point configured to provide the mobile phone access to a network such as the Internet. Further, the transmitter device 101 and receiver device 102 may each be components of a transceiver at their respective devices, wherein those transceivers may include addition circuitry (not shown) enabling each of the devices to transmit and receive communications across the communications channel 180. The communications channel 180 may be a wireless channel (e.g., WiFi, Long-Term Evolution (LTE)), or may be a wired channel, a fiber optic channel, a free space optical channel, or a fluidic channel.

The system 100 may operate to optimize communications between the transmitter 101 and receiver 102 across the channel 180. In doing so, the transmitter 101 may determine an optimal configuration under which to modify a physical layer signal 142 for transmission across the channel 180. Such optimization may include one or more goals, such as minimizing signal error rate by the receiver device 102, accurate classification of the transmitted signal 146 by the receiver 102, and/or accurate authentication of the transmitter device 101 by the receiver device 102. For example, the system 100 may operate to authenticate the transmitter device 101 through fingerprinting (e.g., radio fingerprinting) of signals transmitted across the communications channel 180. During such an operation, at the transmitter device 101, a transmitter 110 may first generate the physical layer signal 142. The physical layer signal 142 may be a data signal as configured for transmittal by the physical layer of the transmitter device 101 across the communications channel 180, and may encompass data, commands, a test pattern, or other communications intended for transmission to the receiver device 102. A physical signal modifier 112 may include a filter such as a finite impulse response (FIR) filter, and may receive and modify the physical layer signal 142 in a manner that emphasizes a set of characteristics that are imprinted on the physical layer signal 142 by the physical layer (e.g., hardware) of the transmitter device 101. These characteristics may be referred to as a "signature" or a "fingerprint" of the transmitter device 101. In order to emphasize those characteristics, the physical signal modifier 112 may modify the signal 142 as a function of a set of signal modification parameters 122 as described in further detail below. A communications interface 114, in turn, may transmit the resulting modified physical layer signal 144 as a transmitted signal 146 across the communications channel 180, where it is received by an interface 190 at the receiver device 102.

The interface 190 may produce a received physical layer signal 154 corresponding to the transmitted signal 146, and a processor 192 may process the signal 154 to extract signal data and/or determine one or more characteristics about the signal 154. For example, the processor 192 may demodulate the received signal 154 and decode packets encoded in the received signal 154. In doing so, the processor 192 may generate a feedback signal 166 indicating the success of such operations, such as a bit error rate (BER). In a further example, the processor 192 may include a classifier (e.g., a convolutional neural network) to classify the signature characteristics of the received signal 154 to determine correspondence with the signature of the transmitter device 101, and may output the feedback signal 166 accordingly. The classification indicator may include a predicted class indicating a highest probability match to a known device (such as the transmitter device 101), and the score (e.g., a softmax or gradient) may indicate an estimated probability that the classification is accurate.

The interface 190 may then transmit the feedback signal 166 (or a signal representing some or all information of the feedback signal 166) across the communications channel 180 (or a different communications channel) to the transmitter device 101. An ML agent 120 (e.g. a DRL agent, such as a twin delayed deep deterministic policy gradients (TD3) learning agent) may then parse the feedback signal 166 to identify relevant feedback information from the signal 166. Based on the identified feedback information and data associated with prior modification parameters stored at a status data store 128, the ML agent 120 may generate the modification parameters 122 that instruct the physical signal modifier 112 to generate the modified physical layer signal 144 in accordance with the parameters 122. A communications interface 114, in turn, may transmit the resulting modified physical layer signal 144 as a transmitted signal 146 across the communications channel 180, where it is received by an interface 190 at the receiver device 102.

As a result of the emphasized characteristics of the modified physical layer signal 144, the transmitted signal 146 is received by the receiver device 102 in a state that it optimized for accurate receipt and processing by the receiver device 102. For example, the processor 192 may decode packets from the received signal 154 with greater accuracy, and/or the signature of the transmitter device 101 may be more clearly determined in the received physical layer signal 154, thereby compensating for any degradation of the transmitted signal 146 imposed by the communications channel 180.

Figure 2:
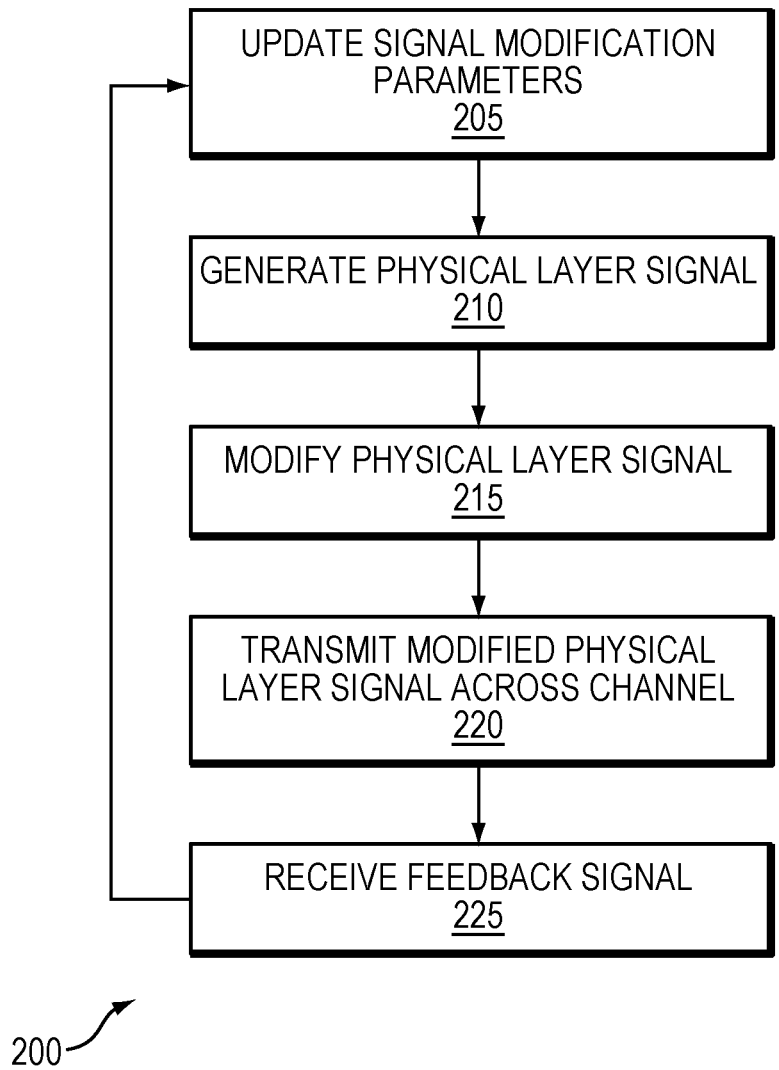
FIG. 2 is a flow diagram of a process operated by a transmitter in one embodiment.

FIG. 2 is a flow diagram of a process 200 that may be operated by a transmitter device to generate a signal for transmission. With reference to FIG. 1, the transmitter device 101 may receive the feedback signal 166 from the receiver device 102 via the communications channel 180, and, in response, may generate updated signal modification parameters 122 for the physical signal modifier 112 (205). If the receiver device 102 has not yet provided a feedback signal (e.g., prior to a first transmission by the transmitter 101), then the physical signal modifier 112 may instead implement a default set of parameters or a set of parameters from a previous transmission session.

The transmitter 110 may then generate the physical layer signal 142 (210). The physical signal modifier 112, in turn, may receive and modify the physical layer signal 142 as a function of the aforementioned signal modification parameters (215). The communications interface 114 may then transmit the resulting modified physical layer signal 144 as a transmitted signal 146 across the communications channel 180, where it is received by an interface 124 at the receiver device 124 (220). After a period of time following processing of the received physical layer signal 154, the receiver device 102 may return a subsequent feedback signal 166, which is received by the interface 114 (225). The transmitter device 101 may then repeat the process 200 beginning with generating updated signal modification parameters 122 for the physical signal modifier 112, and then modifying subsequent physical layer signals under the updated parameters.

Figure 3:
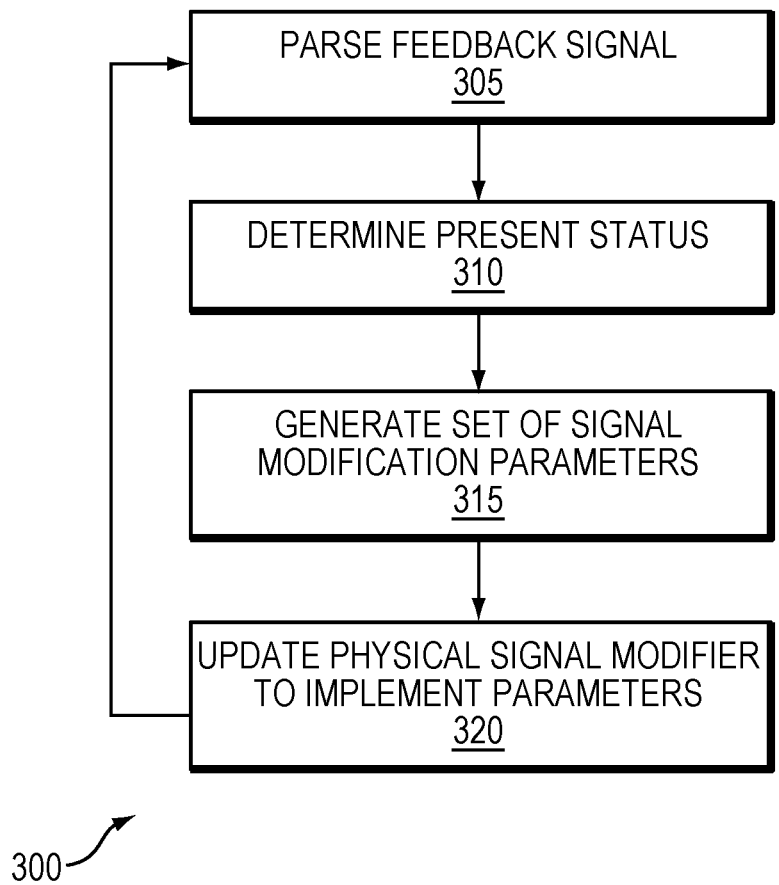
FIG. 3 is a flow diagram of a process operated by a receiver in one embodiment.

FIG. 3 is a flow diagram of a process 300 that may be operated by a ML agent at a transmitter device to process a feedback signal and generate a set of signal modification parameters. With reference to FIGS. 1 and 2, the interface 114 may receive the feedback signal 166 from the receiver 102 and provide the feedback signal 166 (or a representation thereof) to the ML agent 120. The ML agent 120 may parse the feedback signal 166, which may be responsive to a previous modified physical layer signal 144 that was transmitted as a transmitted signal 146 across the communications channel 180 (305). For example, if the processor 192 includes a classifier configured to classify one or more characteristics of the received signal 154, then the feedback signal may represent a predicted class or a softmax of the modified physical layer signal output by a signal classifier at the receiver device 102. The predicted class may identify one or more characteristics of the modified physical layer signal, such as a communications protocol, modulation format, frequency band, communications technology, and encryption scheme. The feedback signal 166 may also represent a predicted modulation class or a predicted radio frequency (RF) fingerprint of the modified physical layer signal output by a signal classifier at the receiver. Alternatively, the feedback signal 166 may represent an error rate output by the receiver, the error rate indicating a rate of error in decoding the modified physical layer signal. Thus, the transmitter device 102 may utilize the feedback signal 166 from the receiver device 102 in the absence of a classifier at the receiver device 102.

The ML agent 120 may then determine a present tuning status as a function of the present set of signal modification parameters 122 (e.g., the parameters used to generate the previous modified physical layer signal 144) and the feedback signal 166 (310). As described below, the tuning status may be a tuple including values representing the first set of signal modification parameters and the feedback signal.

The ML agent 120 may generate a subsequent set of signal modification parameters based on the present tuning status and a set of stored tuning statuses that are stored at the status data store 128 (315). The ML agent 120 may have previously undergone a training process to generate the stored tuning statuses via a training process, as described in further detail below. Such training may involve the ML agent 120 incorporate a range of noise signals into a physical layer signal during the training process, thereby producing stored tuning statuses that correspond to a range of different channel conditions to inform the ML agent 120 when determining the signal modification parameters. As described above, if the receiver device 102 includes a classifier, then the present tuning status may be a function of a feedback signal that indicates a predicted class, softmax or other result output by the classifier. However, the feedback signal 166 may be limited to such high-level classification results. Thus, the ML agent 120 may generate the subsequent set of signal modification parameters absent an indication of model parameters or weight values implemented by a signal classifier at the receiver.

Lastly, the ML agent 120 may update the physical signal modifier 112 to implement the subsequent set of signal modification parameters (e.g., parameters subsequent to the parameters 122) to produce a subsequent modified physical layer signal 144 to be transmitted across the communications channel as the transmitted signal 180 (320). For example, the physical signal modifier 112 may include a FIR filter configured to modify the physical layer signal 142 by modifying a set of FIR taps, and the modification parameters 122 may specify the modified FIR taps. The ML agent may also determine a subsequent tuning status that indicates the second set of signal modification parameters, and then update the data store 128 to include the subsequent tuning status, thereby developing the reference database for future operations. The process 300 may be repeated continuously or periodically in response to the transmitter device 101 receiving subsequent feedback signals from the receiver device 102.

Figure 4:
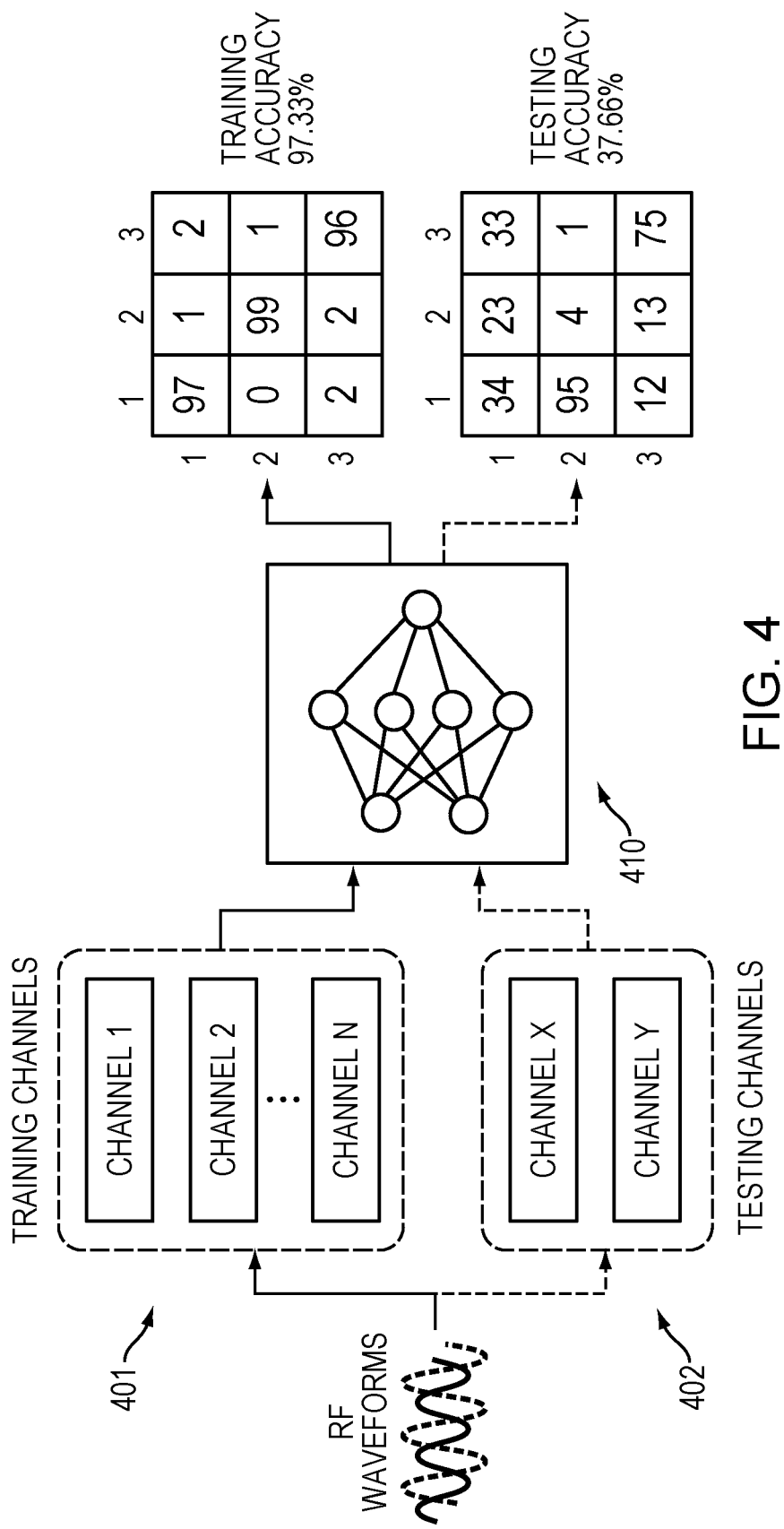
FIG. 4 is a diagram illustrating classifier predictions of training and testing channels.

FIG. 4 is a diagram illustrating performance of a classifier 410 in predicting classification of training channels 401 and testing channels 402. As shown in this example, the classifier 410 averages an accuracy of 97.33% when classifying the training channels 401, yet averages an accuracy of 37.66% when classifying the testing channels 402. Because the classifier 401 cannot be trained on all possible channel distributions (and realizations), the accuracy will necessarily drop with the testing channels 402 that are different from the training channels 401 processed by the classifier 410 during training. In some cases, the accuracy for testing channels can drop close to that of random chance, thus making the classifier unusable and unreliable. Although the model of the classifier 410 could be retrained or fine-tuned with new data, once deployed, DL systems implemented in hardware are difficult to retrain in real-time as devices usually have limited computational capabilities, and storage might not be always enough to maintain a training dataset.

Finite Impulse Response (FIR) filters can be implemented at the transmitter side of a communications channel. By manipulating the position in the complex space of transmitted IQ samples, FIR filters can "synthesize" waveforms such that the salient features of each class are preserved at the receiver side despite the negative effect of channel action and without compromising the bit error rate (BER). Waveform synthesis can then be performed by using FIRs that are computed offline using traditional mathematical optimization. This approach can boost classification accuracy by 58% under different channel conditions. However, prior applications of FIR filters are static and used in a deterministic fashion by applying them to all transmissions without considering the current channel conditions. As described below, such an approach underperforms under diverse and highly-dynamic channel conditions. Moreover, existing work does not take real-time aspects into consideration. Because channels usually change in a matter of milliseconds, it is advantageous to provide a solution fast enough to operate within channel coherence time.

Example embodiments, described below, provide a DRL-based adaptive system for channel-resilient WSC applications. Rather than re-training the classifier, carefully crafted distortions are added to the transmitted waveform, aiming at restoring and amplifying signal features that are lost after distortions introduced by the wireless channel. This solution is especially helpful in cases where (i) data is scarce and unbalanced; and (ii) the node has limited computational resources to rapidly re-train and fine-tune the model. This result may be achieved by leveraging Finite Impulse Response (FIR) filtering. Because different channel conditions affect received waveforms (and their features) differently, example embodiments can distort transmitted waveforms on a per-channel basis by generating FIR filters that are tailored to each channel condition. A brief overview on FIR filtering, and how it can be used to artificially distort transmitted waveforms to increase classification accuracy, is described below.

FIR filtering is a DSP technique that makes it possible to filter signals via a limited number of coefficients (i.e., the FIR taps). Although FIR filters are usually employed to suppress undesired frequency components of wireless signals, it is possible to change the amplitude and phase of transmitted waveforms in the complex plane, introducing artificial distortions to the signal, by properly tuning the values of each FIR tap. Thus, for any given complex-valued signal x=(x[n])$_{n=1, \ldots, N}$, and FIR filter with complex taps h=(h[m])$_{m=1, \ldots, M}$, the n-th filtered element of x can be expressed as follows:

$$\bar{x}[n] = \sum_{m=0}^{M-1} h[m]x[n-m] \quad (1)$$

The advantages of FIR filtering for wireless applications are manifold: (i) FIRs have a linear input/output relationship that can be expressed in closed-form; (ii) the output can be computed via fast discrete convolution algorithms in O(N log N), thus allowing their usage for real-time applications; (iii) FIRs can efficiently control the position of transmitted IQ samples in the complex-space with just a few taps; and (iv) FIRs can be compensated out from the received waveform at the receiver side, thus removing any distortion added by the FIR.

FIGS. 5A-B illustrate two example binary phase-shift keying (BPSK) waveforms at left, as well as the output of a classifier, at right, specifying the probability that each waveform is classified as BPSK. FIG. 5A shows a waveform that has been extracted from the dataset and fed to the classifier, with a prediction accuracy of 54.3%. FIG. 5B shows a waveform has been obtained by filtering the waveform of FIG. 5A with a FIR filter that has been computed by an example embodiment. As shown in FIG. 5B, FIR filtering increases classification accuracy in this example by 64%.

Figure 6:
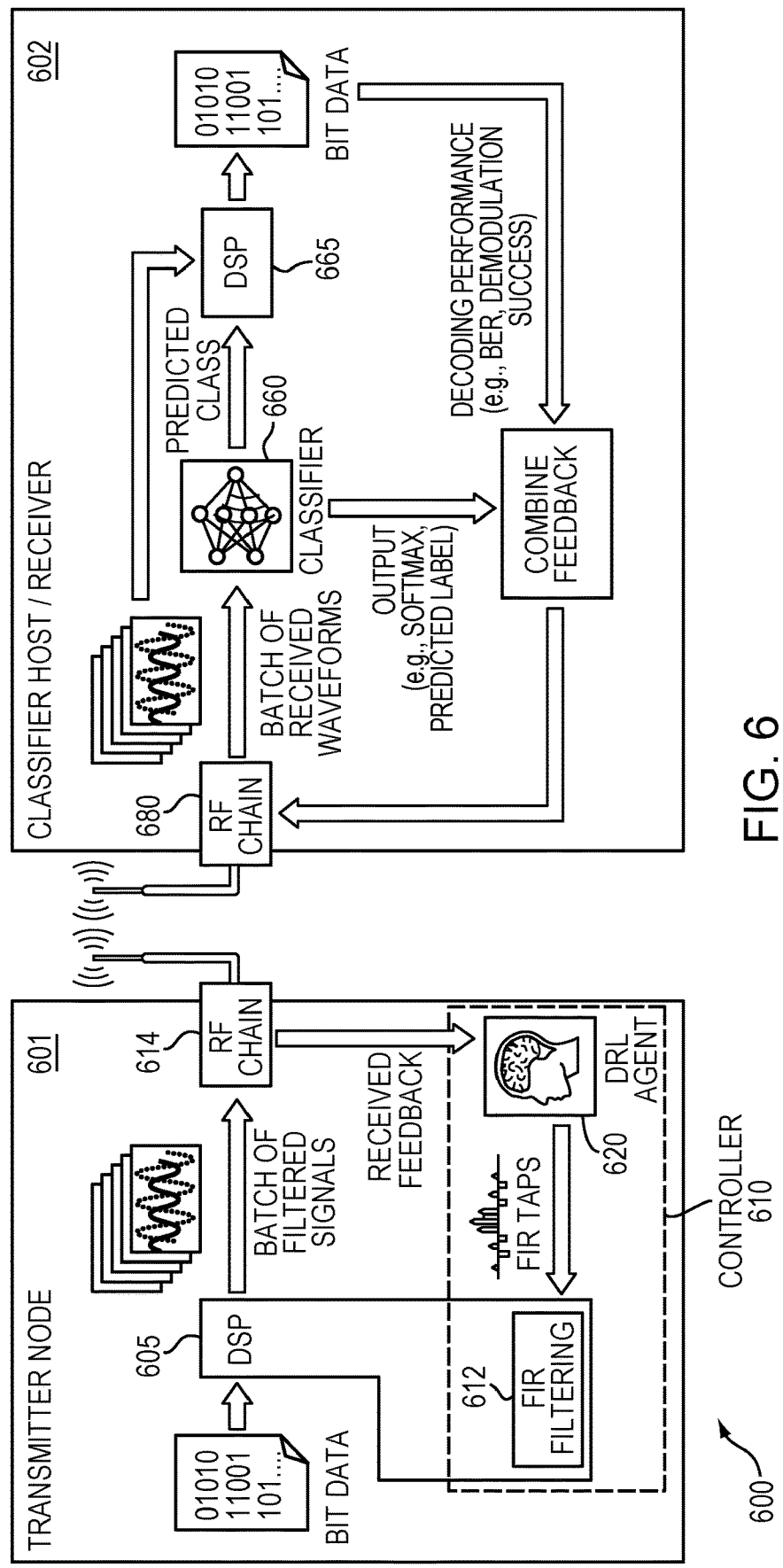
FIG. 6 is a block diagram of a communications system in one embodiment.

FIG. 6 is a block diagram of a communications system 600 in one embodiment. The system 600 may incorporate some or all features of the system 100 described above. The receiver 602 may be equipped with a wireless signal classifier 660 (e.g., a neural network) trained to perform WSC tasks such as radio fingerprinting, modulation recognition, and/or other tasks. The classifier's structure may have a range of different configurations that are not known to the transmitter, and the classifier may output a single label identifying the predicted class out of C possible classes. For example, in the case of modulation classification, the classifier is fed with received waveforms and outputs the predicted modulation scheme that has been applied to those waveforms (e.g., BPSK, QPSK, etc). The output of the classifier is actively utilized within the receive chain to further process the received waveforms. For example, in the case of modulation recognition, the predicted labels is used to demodulate and decode received signals, while in RF fingerprinting applications waveforms might be decoded and deciphered by using transmitted-specific encryption keys. A digital signal processor (DSP) 665, may process the output of the receiver interface 680 based on the predicted class output by the classifier 660 to generate corresponding bit data (e.g., data packets). In example embodiments, the accuracy of the classifier plays a vital role in the communication process, as misclassifications would inevitably results in decoding errors.

At a transmitter device 601, a controller 610 may include two main components: a DRL agent 620 and the FIR filtering component 612. The DRL agent 620 may be an implementation of the ML agent described above, and may incorporate some or all of the ML agent features described above. Likewise, the FIR filtering component 612 may be a component of a DSP 605 and may incorporate some or all features of the physical signal modifier described above. The DSP 605 may further operate to generate the modified (e.g., FIR-filtered) physical layer signal that is transmitted to the receiver device 602 via the transmitter interface 614. The controller 610 may operate under a "black-box" approach where the transmitter 601 has no access to the classifier 660 (e.g., model, weights) and can only receive partial feedback from the receiver 602 hosting the classifier 660 periodically. Specifically, example embodiments may apply a specific set of FIR taps to a set of consecutive waveforms, and the receiver 602 feeds back relevant information regarding these waveforms to the transmitter 601. The receiver 602 and transmitter 601 may cooperate to improve the accuracy of the WSC task, hence the feedback generated by the receiver is truthful.

As shown in FIG. 6, two potential classes of feedback may be used: classifier-specific and communication-specific. Classifier-specific feedback includes any information available at the output of the classifier such as predicted labels (out of C possible classes) and softmax output of the classifier. For the sake of generality, both the case where the receiver can either feedback the above metrics for all the W waveforms in the batch, or only send average results across the whole batch, were considered. As described below, average values may be sufficient for example embodiments to increase the classification accuracy. Communication-specific feedback may include BER, percentage of successfully decoded packets and demodulated signals.

The importance of this feedback is illustrated in a scenario in which the receiver uses a neural network (NN) classifier to first recognize the modulation of incoming waveforms and demodulate them by using NN inference. If the classification procedure is correct, the receiver would be able to properly demodulate and decode received data. On the contrary, in the case of misclassification (due to channel impairments) the receiver would not be able to demodulate received signals, eventually resulting in higher demodulation errors.

After deployment of transmitter 601 and receiver 602, the transmitter's data may be processed as is by DSP units and converted into waveforms that are transmitted over the wireless channel. Upon reception, the receiver extracts W>0 IQ samples sequences (i.e., a batch) of length L, where L represents the input size of the classifier. The latter processes the extracted batch and outputs the probability that the input belongs to a specific class (e.g., modulation or device identifier in the case of modulation recognition or RF fingerprinting, respectively) as well as the final predicted class. Then, received waveforms are fed to the DSP 665 module that leverages the output of the classifier to properly decode received signals.

Once received waveforms are processed, the receiver generates feedback containing prediction and decoding results that are sent back to the transmitter. Upon reception of such feedback, the DRL agent decides whether or not to compute a new set of FIR taps to be applied to future transmissions so as to improve the classification accuracy of the classifier. For example, if a batch of waveforms has been successfully demodulated by the receiver, the DRL agent does not need to compute new FIR taps as transmitted waveforms are already being classified correctly. On the contrary, if channel action is introducing distortions that result in the receiver reporting the wrong classification labels, the DRL agent reacts to counteract channel action and computes a new set of FIR taps that would restore signal features and increase the accuracy of the classifier.

To summarize, example embodiments provide several major and fundamental advantages to WSC problems. First, example embodiments may be model-free. Existing approaches are mostly "white-box" meaning that they need either access to the classifier and its gradients. On the contrary, example embodiments may be black-box, meaning that they can be agnostic to channel conditions, wireless model, and classification problem at the receiver. As mentioned before, the DRL feedback does not embed any information on the specific WSC problem solved by the classifier. Therefore, example embodiments are capable of operating in any channel condition and can be applied to a variety of classification problems in the wireless domain. For example, the same instance of the a DRL agent in an example embodiment can be applied to RF fingerprinting and modulation classification problems without any modification.

Second, example embodiments may operate with minimal feedback. The DRL agent may learn how to compute FIR taps by leveraging minimal amount of information from the receiver. Too much information might generate too high overhead, which would eventually result in increased power consumption. Third, being model-free, example embodiment may not need to learn the features of the classifier directly. Instead, the DRL agent may learn how to select specific actions (e.g., FIR taps) to respond to specific outputs of the classifier. In fact, the DRL agent may leverage a classifier's output (e.g., softmax), which provides useful information on the activation of neurons at the last layer of the classifier, and thus allows the agent to compute FIR taps that fire the desired neuron of the classifier. As a consequence, the agent learns by itself what are the features that trigger a specific neuron, and learns how to amplify them while counteracting negative channel effects.

Fourth, example embodiments may compute new FIR taps as soon as the receiver reports misclassifications. In this way, the transmitter can achieve channel-resilient WSC adaptively by rapidly responding to varying and possibly unseen channel conditions. Conversely, existing approaches compute FIR taps offline over entire training datasets. Such an approach has several drawbacks: (i) since FIRs are computed on large amounts of data, taps are effective on average but are not designed to counteract specific channel conditions, meaning that FIRs might work efficiently for some channel conditions but sonorously fail under different channels; (ii) computational complexity is high due to the size and diversity of the dataset, which prevents fast convergence; and (iii) statically assigned taps do not properly work (and might be harmful) under unseen channel conditions.

The DRL model implemented by the DRL agent 620 may be configured by capturing the features and requirements of the specific application as well as learning how to adapt promptly to diverse inputs. To define a DRL system, it is beneficial to specify the environment where the agent operates, the state of the environment that can be observed by the agent and the actions the agent can take to respond to each observation of the environment, and the corresponding reward that the agent uses to score each action.

Figure 7:
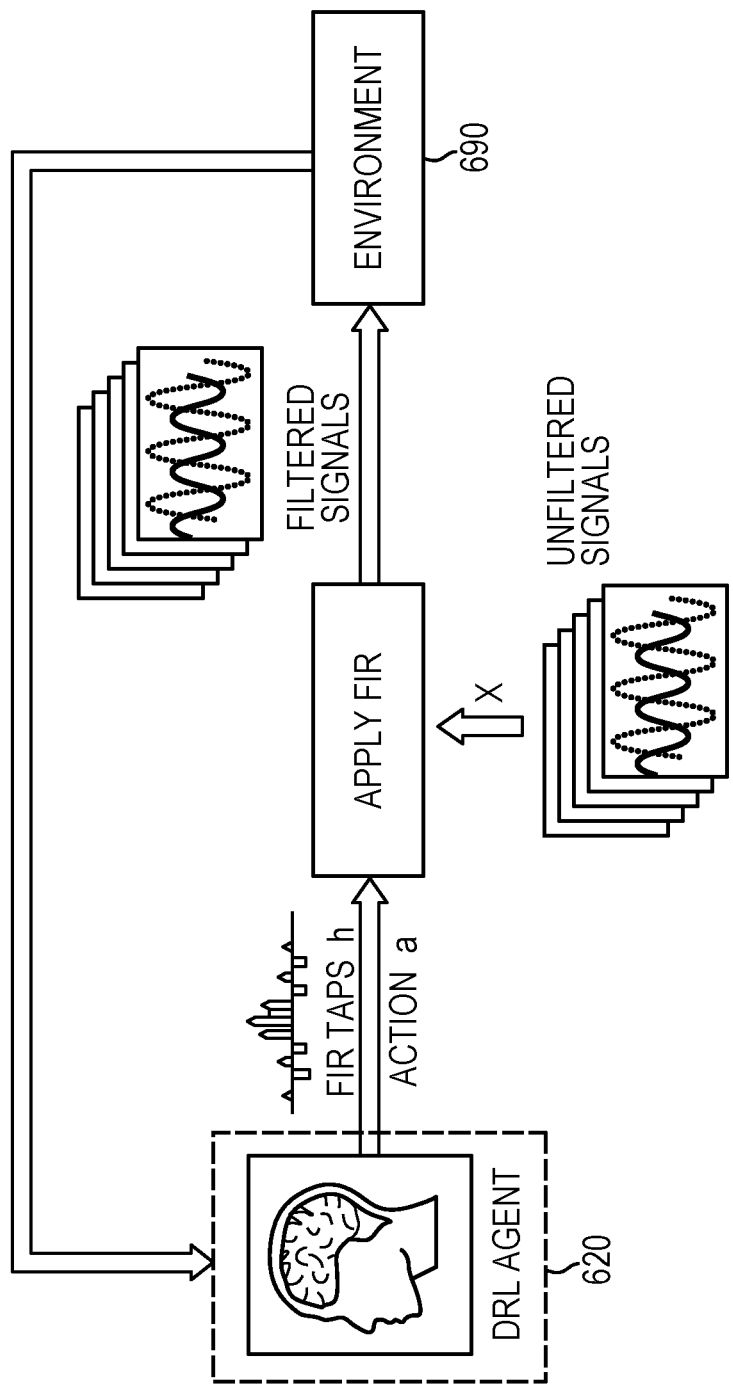
FIG. 7 is a flow diagram of interaction between a communications system and an environment in one embodiment.

FIG. 7 is a flow diagram of interaction between a communications system including the example DRL framework and an environment in one embodiment. The environment 690 is identified with the receiver sending feedback (i.e., the observation) on the state s of the classifier (i.e., the accuracy). Similarly, the action a corresponding to the selection of FIR taps h, (i.e., h=a), to synthesize waveforms x according to equation (1) and generate transmitted waveforms y. The reward r (described further below) is then used by the DRL agent to determine whether or not the selected action has improved the accuracy of the classifier at the receiver side.

For example, let S be the set of all possible states, and let A be the FIR taps space representing the set of actions. A default FIR configuration may be defined with values $h^o=[1, 0, 0 \ldots 0]$ representing the case where no distortion is added to the waveform. Also, because waveform synthesis with excessively large FIR taps can potentially distort transmitted waveforms, the maximum and minimum values of both real an imaginary parts of each tap are constrained. Specifically, let $h[m]$ be the m-th tap of a FIR filter h computed by the ML agent and $\alpha$ be a small real number. A feasible FIR filter may satisfy the following conditions:

a) $Re(h[m]) \in [Re(h^o[m])-\alpha, Re(h^o[m])+\alpha$
b) $Im(h[m]) \in [Im(h^o[m])-\alpha, Im(h^o[m])+\alpha$, with $h^o[m] \in h^o$.

FIR taps that satisfy these conditions may be effective and do not deteriorate transmitted signals and BER significantly.

For such a DRL problem, an agent may be identified that learns a policy $\pi(s): S \rightarrow A$ (i.e., the actor policy), maximizing the discounted sum of rewards:

$$R = \Sigma_{\tau=0}^{T} \gamma^\tau r_\tau$$

where T represents the horizon of the maximization problem and $\gamma>0$ is a term to weigh instantaneous versus future rewards.

Traditional RF algorithms solve the above discounted reward maximization problem via the Bellman's equation. Specifically, they assign a score $Q(s,a)=r+\gamma \max_{a' \in A} Q(s',a')$, meaning that the Q-value, to each action-state pair, and compute a policy that selects those actions providing the highest scores. However, for high dimensional spaces (such as those applicable in example embodiments), these approaches result in state-space explosion and may not be practical.

The example embodiment shown in FIG. 7 may be configured to satisfy the following constraints: noise robustness and continuous actions. Regarding noise robustness, a major challenge in machine learning-based wireless communications is the resiliency of the system against channel noise (e.g., fading, multi-path). Although the DRL agent receives feedback from the receiver, this information is always related to past channel conditions and, although the channel might change slowly over time, the DRL agent may be able to compute FIR taps that are effective against channel conditions that are either completely or slightly different from those experienced by previous transmissions. As a consequence, the designed solution must be robust against noise and stochastic perturbations of channel conditions.

Regarding continuous actions, even though there are many problems where DRL agents are trained to select among a finite set of actions (e.g., move left, pick up an object, select a transmission channel), waveform synthesis relies upon complex-valued FIR filters. This is a particularly relevant feature, as minimal variations to taps could distort the waveform to a large extent and negatively impact the classification/decoding process at the receiver side. As a consequence, FIR taps must be continuous so that the example embodiment can achieve fine-grained control over the transmitted waveforms and their IQ samples, thus providing an accurate and reliable tool to synthesize waveforms.

Figure 8:
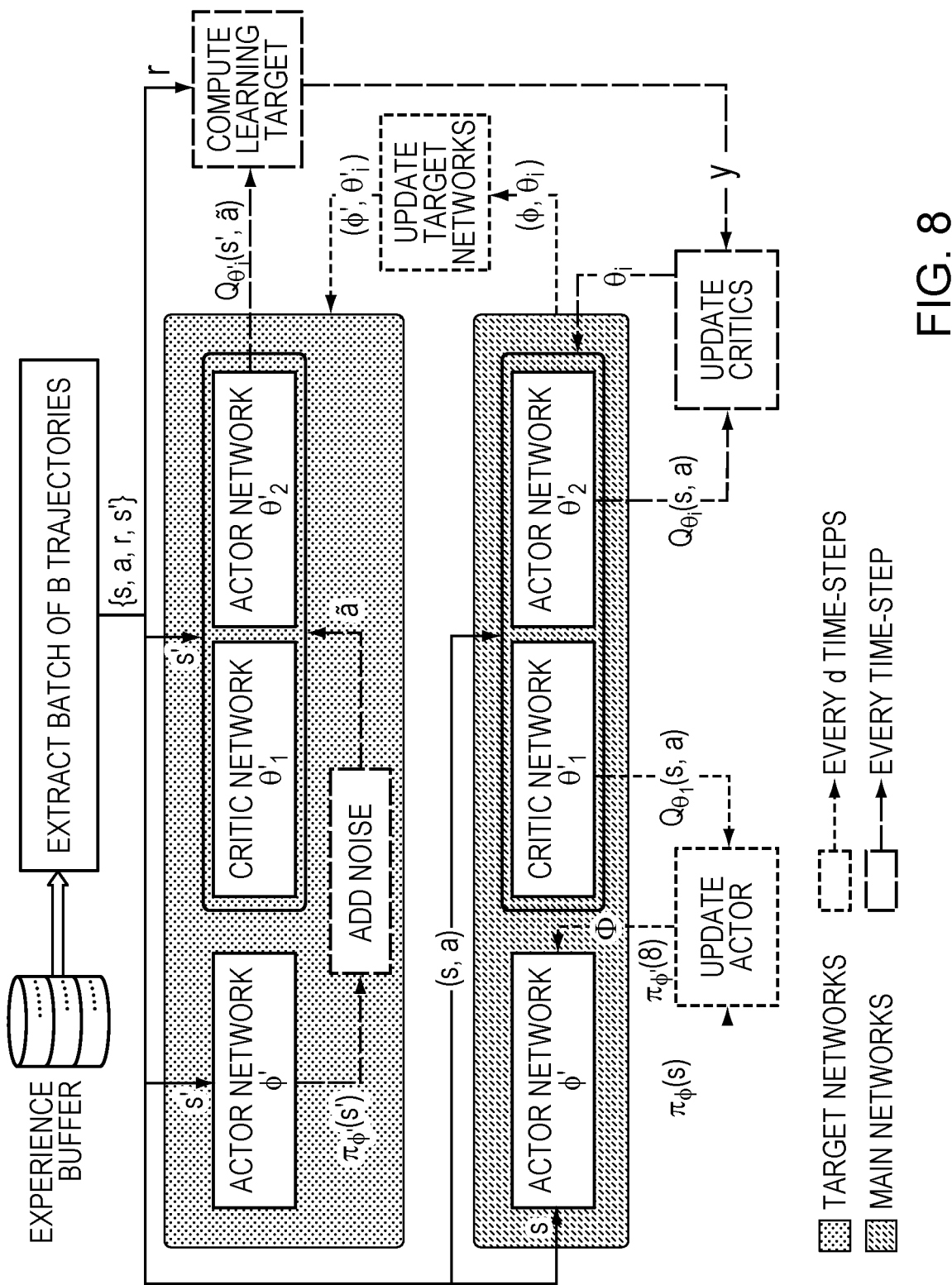
FIG. 8 is a block diagram of an architecture of a ML agent in one embodiment.

FIG. 8 is a block diagram of an architecture of an ML agent 820 in one embodiment. To address the challenges described above, an example embodiment may implement features of a Twin Delayed Deep Deterministic Policy Gradients (TD3) model (an extension of the well-established Deep Deterministic Policy Gradients (DDPG) model). FIG. 8 provides an overview of the considered architecture whose building blocks and architectural components are described in further detail below.

TD3 provides a number of advantages. First, it approximates Q-values via deep neural networks (DNNs), thus alleviating the state-space explosion. Specifically, the computation of the optimal policy π(s) is achieved by leveraging an actor-critic setup with (i) one actor network with weights φ that learns the actor policy: πφ(s): S→A, and (ii) two critic networks (i.e., the twins) with weights θ1 and θ2 that are trained to approximate the Q-values $Q_{\theta_i}$ (s,a). At a high-level, the actor is the network that decides with actions to take, and the critics teach the actor how to better select actions. Second, since TD3 supports continuous actions, gradients of rewards can be computed with respect to the learned actor policy. In other words, (i) a deterministic policy gradient can be applied to the update learned policies; and (ii) the agent can implement target policy smoothing where noise is added to actions computed by the target actor policy. This procedure makes the training process less dependent on Q-values, and more robust against estimation errors and noisy wireless channels.

Third, twin critics prevent overestimation of Q-values. Indeed, one-critic systems are prone to overestimation of the Q-values and thus, biased actor policies. To overcome this problem, TD3 leverages two critic networks whose weights θi are updated iteratively by "clipping" Q-values estimates of the two critics by considering their minimum only. Fourth, TD3 considers two sets of networks, i.e., the main and target networks, each consisting of one actor and two critics with weights φ, $\theta_1$, $\theta_2$ and φ', $\theta_1'$, $\theta_2'$, respectively. The main networks may be trained at each time-step, and their weights are copied to target networks every d time-steps. This procedure allows to stabilize the training procedure, as main networks are updated with respect to target networks which are frozen for d steps. Fifth, the main actor policy πφ is updated via a deterministic policy gradient. However, the update may be delayed with respect to the main critic networks. Specifically, the actor policy and target networks may be updated every d steps, so that main actor weights φ are updated through more accurate and stable Q-values.

Figure 9:
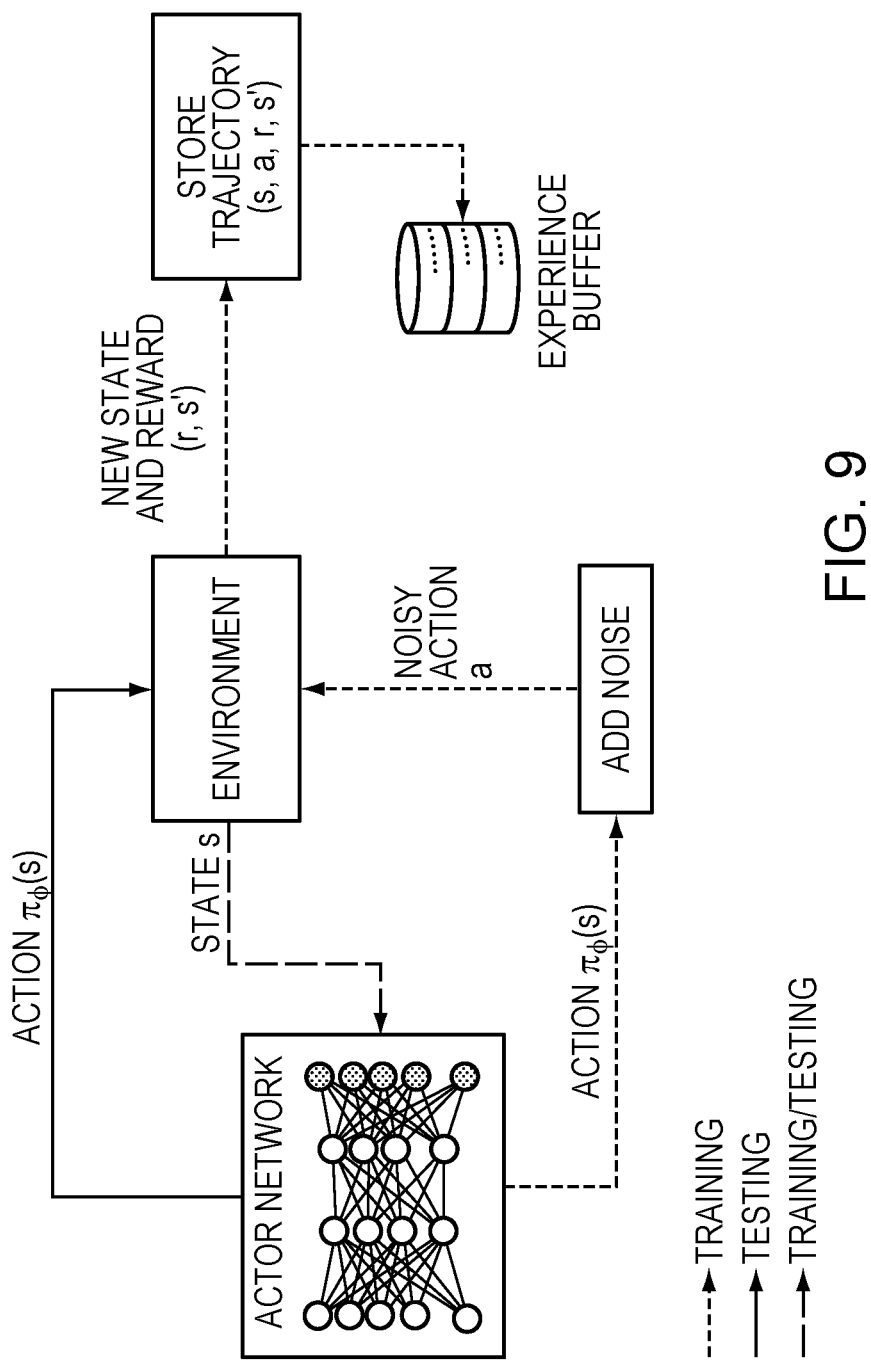
FIG. 9 is a flow diagram illustrating training and testing processes in one embodiment.

FIG. 9 is a flow diagram illustrating training and testing processes in one embodiment. The training procedure relies upon an experience buffer B storing past experiences of the agent. The j-th entry of the buffer is a 4-tuple ($s_j$, $a_j$, $r_j$, $s_j'$) indicating the action $a_j$ taken by the agent in state $s_j$ which gave a reward $r_j$ and transitioned the environment to state $s_j'$. Because the problem considered is non-deterministic following the stochastic behavior of the wireless channel, critics cannot compute Q-values directly, which can instead be obtained by approximating the following:

$$Q_{\theta_i}(s,a) = r + \gamma \mathbb{E}_{s',a'}\{Q(s',a')\} \quad (2)$$

where a' is computed via the actor policy $\pi_\varphi(s')$ and s' follows an unknown state transition distribution p(s,a,s').

At the beginning of the training, all DNNs may be initialized with random weights. Then, the agent may observe the state s and take an action according to the initial main actor policy πφ(s). The action is perturbed by adding Gaussian noise ∈~N (0, σ). The computed action a=πφ(s)+∈ may then then applied to the transmitted waveforms, which are classified by the receiver that sends feedback to the transmitter. The DRL agent may then extract the new state s1 from the feedback and computes the reward r. The tuple (s, a, r, s'), also known as a trajectory or a status of the communications system, may then be added to the experience buffer.

As shown in FIG. 6, noise is added to actor policies during training only. At testing time, no noise is added to the policy. As soon as there are at least B>0 entries in the experience buffer, the DRL agent randomly extracts a batch of B entries and, for each trajectory (sj, aj, rj, s'j) in the batch, computes the noisy target actions ã~j=πφ' (sj)+∈ and the target values:

$$y_j = r_j + \gamma \min_{i=1,2} Q_{\theta_i'}(s_j', \tilde{a}_j) \quad (3)$$

Target values in (3) may be used to update the weights $\theta_i$ of the main critic networks via stochastic gradient descent minimizing the mean-squared Bellman error (MSBE) loss function:

$$L_{\theta_i} = \frac{1}{B}\sum_{j=1}^{B}(Q_{\theta_i}(s_j, a_j) - y_j)^2 \quad (4)$$

where the target values $y_j$ are computed as in (3).

MSBE is a common loss function used in DDPG architectures to measure how good approximated values generated by the critics are in satisfying the Bellman equation in (2), and the experience buffer helps critic networks in generating more reliable and accurate Q-value estimates. As shown in FIG. 8, target networks and the main actor network are updated every d time-steps. Target networks may be updated as follows:

$$\theta_i' \leftarrow \omega\theta_i + (1-\omega)\theta_i' \quad (5)$$

$$\varphi' = \omega\varphi_i + (1-\omega)\varphi_i' \quad (6)$$

This approach may avoid abrupt updates of target weights (and thus stabilizes training procedures) by tuning the ω parameter taking values in [0, 1]. Small ω values result in slow updates of the target weights, while ω values close to 1 rapidly copy main network weights onto target network ones. Finally, the main actor network weights φ are updated every d steps via deterministic policy gradient through gradient ascent:

$$\varphi^{t+1} = \varphi^t + \frac{\chi}{N}\sum_{j=1}^{B}[\nabla_\varphi \pi_\varphi(s_j)\nabla_{a_j}Q_{\theta_1}(s_j, a_j)|a_j = \pi_\varphi(s_j)],$$

where χ is a (decreasing) step-size that ensures the convergence of the updates. Notice that while the main twin critics are updated by clipping Q-values from both networks, the main actor network may be updated by using $\theta_1$ weights only. This step still guarantees convergence under mild conditions.

The reward system may be configured to incentivize FIR taps h that increase the accuracy while penalizing those who result in worsened prediction results or decoding errors. Thus, a large reward $\rho^{SUCCESS}>0$ is given every time the feedback reports the correct classification label. A moderate reward $\rho^{UP}>0$ is given when the feedback shows better prediction results (e.g., the softmax output has increased with respect to the previous transmission). A negative reward $\rho^{DOWN}<0$ is given when the feedback shows that newly computed FIR taps have caused a degradation in either the accuracy of the classifier (e.g., wrong label or decreased softmax output) or the decoding success (e.g., high decoding failure rate). Finally, a reward $\rho SAME=0$ is given when the feedback shows that the system is performing the same as before. In the results of an example embodiment described below, this reward mechanism is demonstrated to allow a system to achieve up to 4.1× gain when compared to other approaches.

Exemplification: Experimental Results

To demonstrate the effectiveness of an example embodiment under diverse conditions, described below are results obtained by applying an example embodiment implementing a DRL agent to a variety of WSC problems and comparing its performance with existing approaches.

One objective is to show how the DRL agent can be seamlessly ported from one WSC problem to another with minimum modifications. For this reason, a unified architecture can be considered, where critic and actor networks are implemented as fully-connected neural networks with 10 layers each consisting of 30 neurons with ReLU activation functions. The learning rate is set to 0.99, target networks and main actor networks are updated every d=2 time-steps and weights are copied from main to target networks with parameter $\omega=0.05$. Unless otherwise stated, the number of taps is set to M=11 and the maximum deviation from the ideal FIR filter $\varphi^0=[1, 0, 0, \ldots, 0]$ is set to $\alpha=0.1$. The batch size used to extract trajectories from the experience buffer is set to B=64, while the buffer stores at most 10000 entries. The case is considered where the receiver feeds back the classification label as well as the softmax output to the transmitter. The reward mechanism is setup as follows. Successful classification gives a reward $\rho^{SUCCESS}=2$, wrong classification but improved softmax output results in a reward $\rho^{UP}=1$, decreased softmax output gives a reward equal to $\rho^{DOWN}=-1$, and a reward $\rho^{SAME}=0$ otherwise.

To demonstrate the capabilities of a DRL agent in an example embodiment, two relevant WSC problems are considered: modulation classification and RF fingerprinting, under three different configurations:

a) Single-label (SLA): This problem is relevant to RF fingerprinting WSC applications where a receiver must recognize a specific transmitter just by looking at small hardware impairments in the received waveforms, i.e., the features. In this case, the DRL agent may synthesize waveforms for the class identifying the transmitter.

b) Multiple-labels (MLA): this is the case where a transmitter changes modulation scheme over time and the receiver leverages DL to detect the employed modulation scheme and demodulate waveforms. In this case, the DRL agent may compute FIR taps that are effective for diverse channel conditions and modulation schemes.

c) Adversarial (ADV): this configuration considers the case of an adversary injecting noise (e.g., a jammer) with the overall objective to produce misclassifications at the receiver side. The DRL agent may counteract adversarial actions and ensure proper classification at the receiver side.

To train and test the DRL agent, two wireless datasets for modulation classification and RF fingerprinting WSC problems are considered. For modulation classification, the publicly available DeepSig RADIOML 2018.01A dataset was used, which contains waveforms from 24 different modulation schemes. For each modulation, the dataset provides approximately 106.000 waveforms under different SNR conditions from −20 dB to +30 dB. The classifier in this case is implemented via a CNN. The input of the classifier consists of a sequence of 1024 complex-valued IQ samples, and the classification is performed via majority-rule voting across a batch consisting of 32 waveforms. The classifier may not achieve acceptable classification performance when the classifier is tested over low SNR conditions. For this reason, the classifier may be trained with waveforms with high SNR (from 20 dB to 30 dB) values and then the example embodiment is enabled to operate under lower SNR conditions (−10 dB to 20 dB), thus simulating the case where the classifier is trained under controlled channel conditions, yet operates under noisy and fading channels.

The second dataset is a publicly available dataset tailored for RF fingerprinting applications containing waveforms recorded with a testbed of 10 Ettus Research USRP software-defined radios transmitting identical WiFi frames. Since in RF fingerprinting problems the DL model must be able to identify the transmitter from its hardware impairments only, frames are generated in GNUradio and contain the same MAC address, thus masking the real identity of the transmitter. In this case, a baseline CNN is considered with a block consisting of two convolutional layers followed by ReLU and a MaxPool layer replicated 5 times, then followed by three fully connected layers. The focus is a single-antenna setup with equalized IQ samples where waveforms are recorded at 10 different times of the day for 2 consecutive days. The input size is equal to 288 complex-valued IQ samples. The classifier may be trained on a specific time of day 1, but it is tested with waveforms recorded at different times. This setup can challenge the classifier by bringing its accuracy close to random guessing. This setup accurately simulates the case shown in FIG. 4 where the classifier operates under unseen channel conditions.

TABLE I

CLASSIFICATION ACCURACY FOR DIFFERENT SETUPS AND PROBLEMS

| Multi-label Classification (Modulation recognition [13]) - No FIR | | | |
|---|---|---|---|
| | High SNR | Low-Mid SNR | Low SNR |
| BPSK | 1 | 0.94 | 0.41 |
| 16QAM | 0.68 | 0.35 | 0.11 |
| 64QAM | 0.65 | 0.63 | 0.23 |

| Single-label Classification (RF fingerprinting [26]) - No FIR | | | |
|---|---|---|---|
| | File 1 - Day 1 | All days | Day 1 | Day 2 |
| Device 7 | 1 | 0.22 | 0.31 | 0.15 |

Multi-Label Modulation Classification

First considered is a realistic use case scenario wherein a WiFi transmitter implements adaptive modulation and coding scheme (MCS) by changing modulation according to time-varying channel conditions. The transmitter adaptively selects between MCS indexes 0, 3 and 5, corresponding to BPSK, 16QAM and 64QAM. The receiver implements the aforementioned CNN classifier which, among others, allows the receiver to detect the modulation of incoming waveforms and infer this knowledge to demodulate received packets. The classifier may be trained with waveforms received in the high SNR regime (i.e., [16,30] dB) but after deployment, the receiver operates in the low (i.e., [−10,4] dB) to mid (i.e., [6,14] dB) SNR regimes. Table I shows the classification accuracy of the classifier when operating in different SNR conditions. The accuracy is greater when testing on channel conditions that are similar to the ones experienced during training (i.e., high SNR), but plummets when operating in lower SNR regimes (up to 6 smaller).

Figure 10:
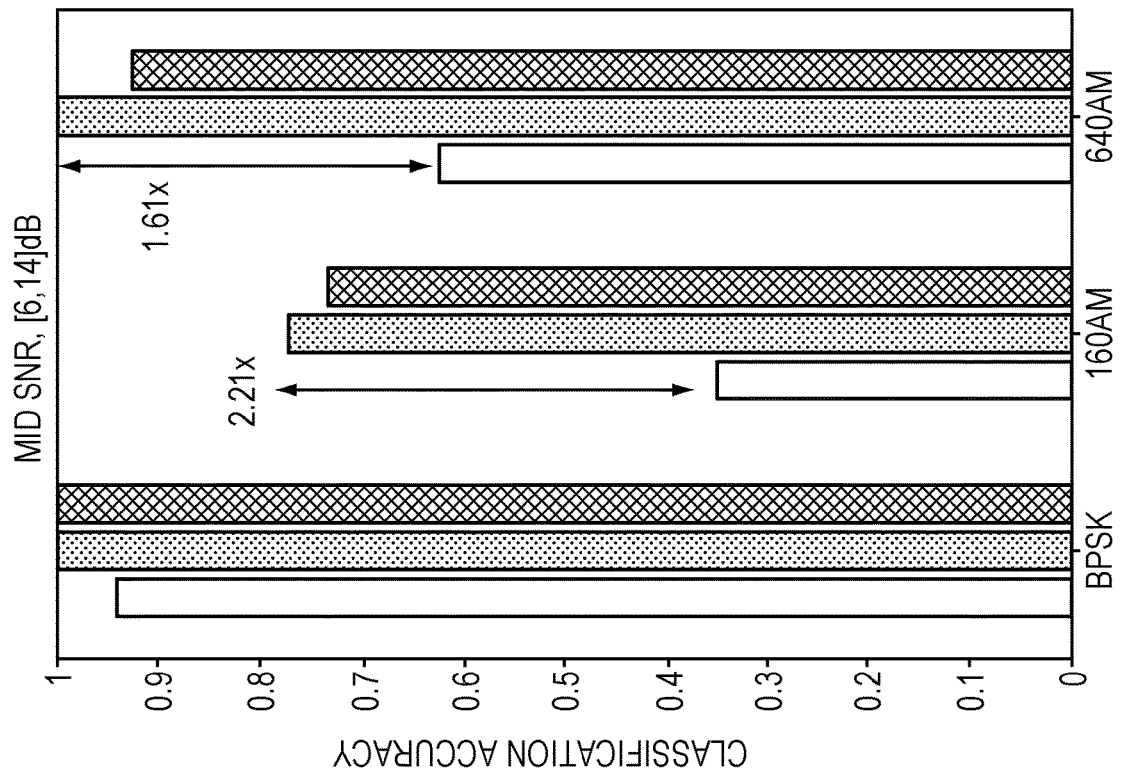
FIG. 10 is a chart depicting classification accuracy in one embodiment.
Figure 10:
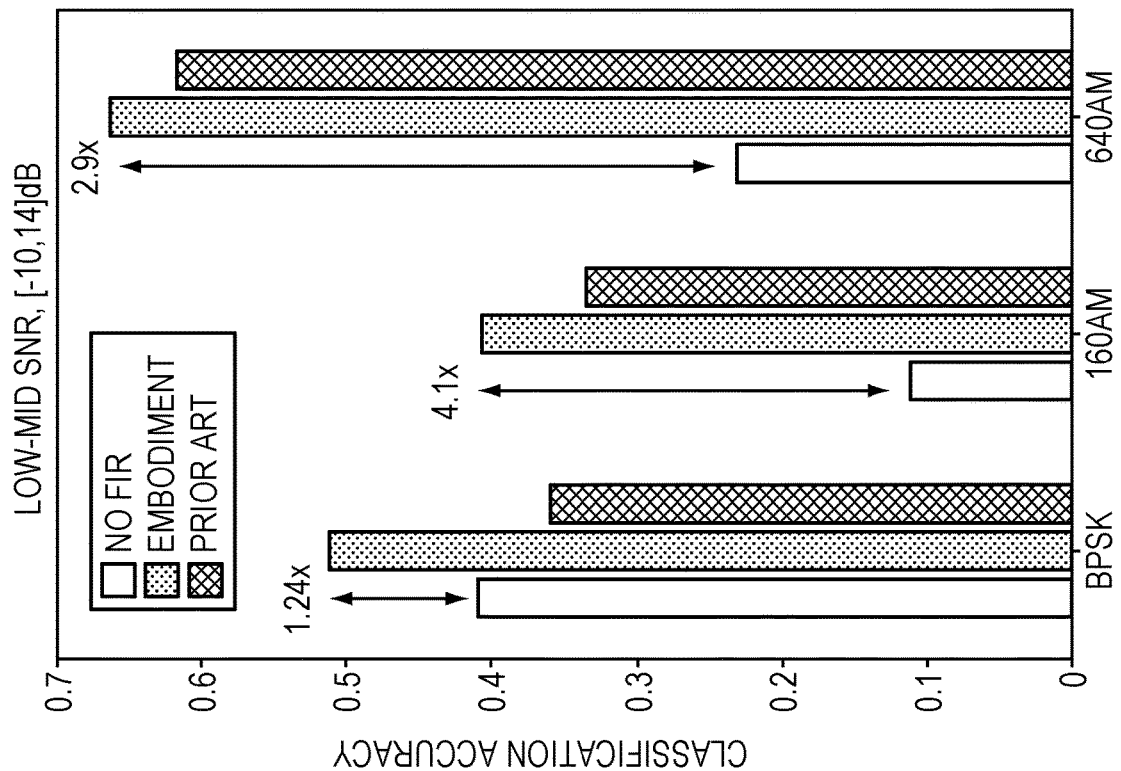

FIG. 10 compares results of an example embodiment against the baseline case with no waveform synthesis and a prior-art approach. The prior-art approach (i) is trained offline for each class over the whole dataset, (ii) requires gradients of the classifier for each input, and (iii) computes one FIR filter to be used in all possible channel conditions. On the contrary, the example embodiment is trained online and does not require any information on the classifier and its architecture. As shown in FIG. 10, the example embodiment always outperforms both of the other approaches, providing accuracy improvements up to 4.1× with average improvements equal to 2.75× and 1.63× in the case of low-mid and mid SNR regimes, respectively. When compared with a prior approach, the example embodiment improves the accuracy of the system by 1.1× on average.

Figure 11:
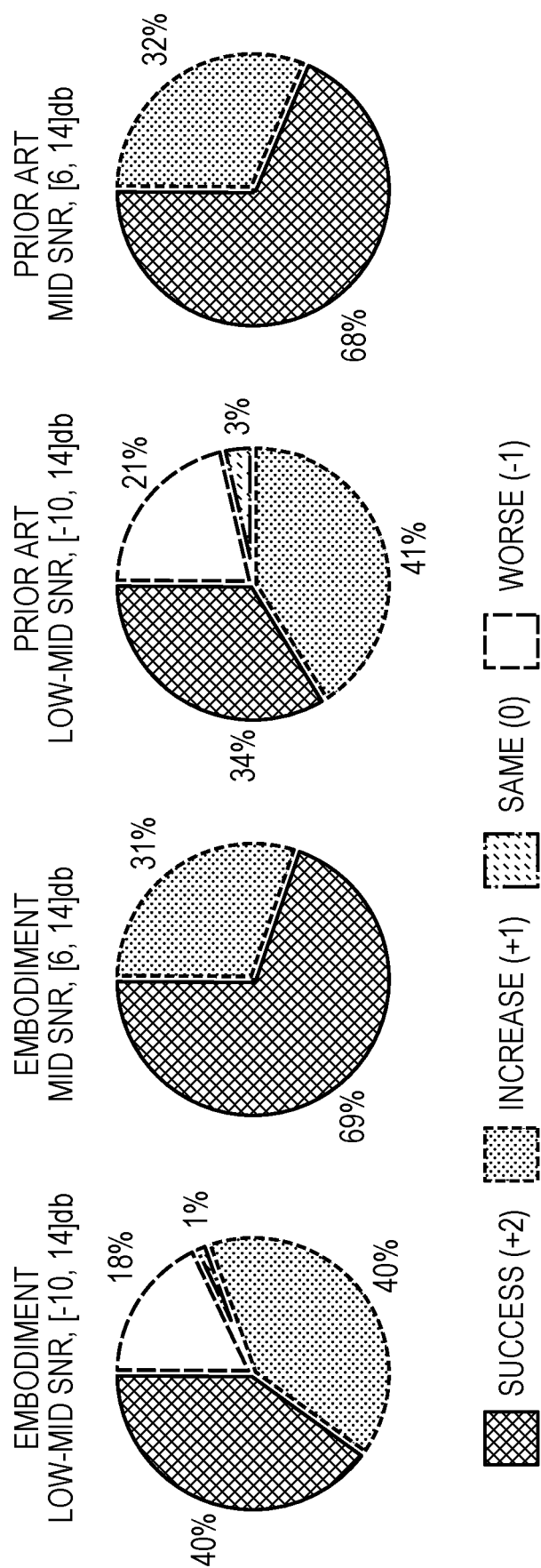
FIG. 11 illustrates reward distribution in one embodiment.

FIG. 11 illustrates reward distribution in one embodiment. To better understand how the example embodiment impacts the classification process, FIG. 11 shows how both the example embodiment and the prior approach impact the output of the classifier. Although both solutions increase the softmax output of the classifier 40% and 31% of times under low-mid and mid SNR regimes respectively, the example embodiment always provides a better success rate than the prior approach. Moreover, the latter generates FIR taps that result in higher softmax decrease rate in low-mid SNR regimes, while both solutions experience no decrease in performance when operating in mid SNR regimes. This demonstrates that using a unique FIR filter for different channel conditions is not an efficient solution, which shall be instead tackled with channel-specific approaches such as in the example embodiment.

Figure 12:
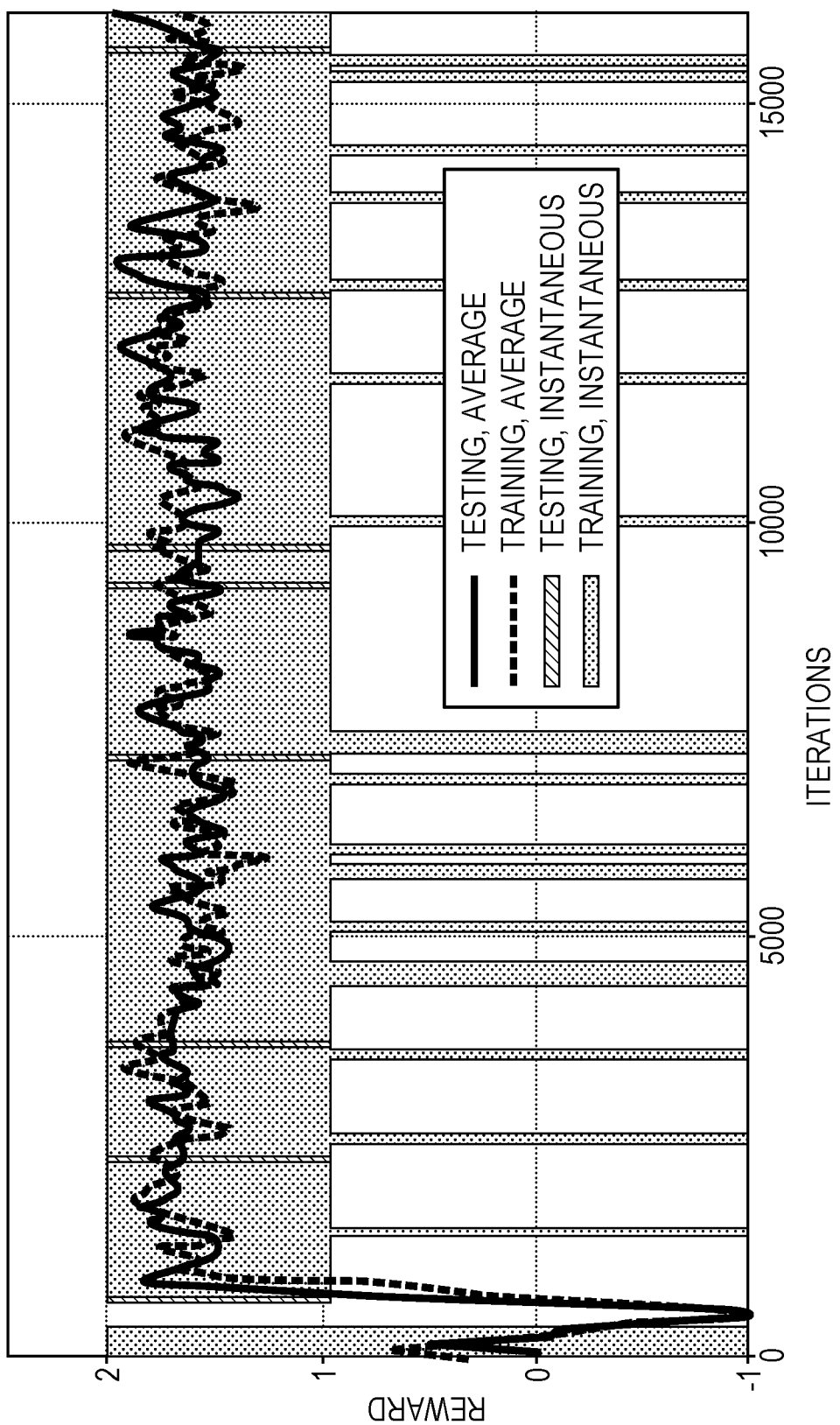
FIG. 12 is a chart illustrating reward convergence in one embodiment.

FIG. 12 is a chart illustrating reward convergence the above example, and shows the convergence speed of the DRL agent, specifically it is shown that the example embodiment approaches the maximum reward $\rho^{SUCCESS}$ after approximately 1,000 learning iterations.

Single-Label RF Fingerprinting

For the problem of single-label RF fingerprinting, device 7 was selected out of the ten devices in the dataset, as this device (see Table I) has shown 100% accuracy when trained and tested on day 1, but exhibits 15% accuracy on average when tested with waveforms from day 2.

Figure 13:
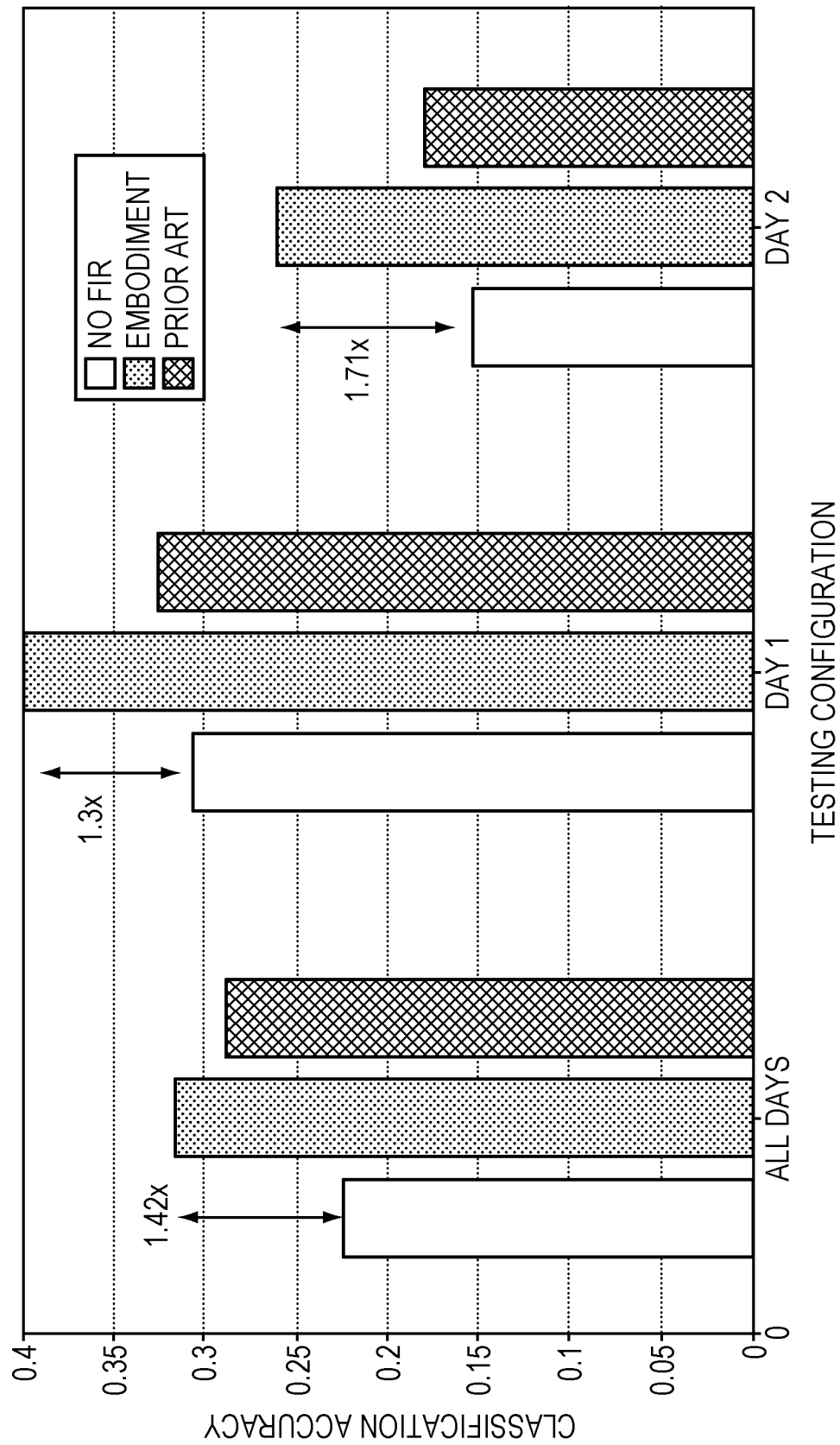
FIG. 13 is a chart illustrating classification accuracy in one embodiment.

FIG. 13 is a chart illustrating the classification accuracy of device 7 for different setups. It is clear that the baseline classifier cannot generalize over different channel conditions. However, the example embodiment increased the accuracy up to factor 1.71 when tested on waveforms recorded on day 2. The reason is that although different, channel conditions during the same day are similar, meaning that the baseline classifier can still achieve a higher accuracy then the case where it is tested on a completely different day. As also illustrated in FIG. 13, the example embodiment outperforms the prior approach by effectively increasing the success rate and providing an overall higher rewards. Notice that gains in the SLA case are lower than those achieved in the MLA case, as the RF fingerprinting dataset uses bitwise similar devices whose hardware impairments are similar, which makes it hard for the classifier to distinguish between devices. In this case, the classifier is already prone to errors due to the similarities between devices, and the example embodiment can only improve the accuracy to a certain extent.

Figure 14:
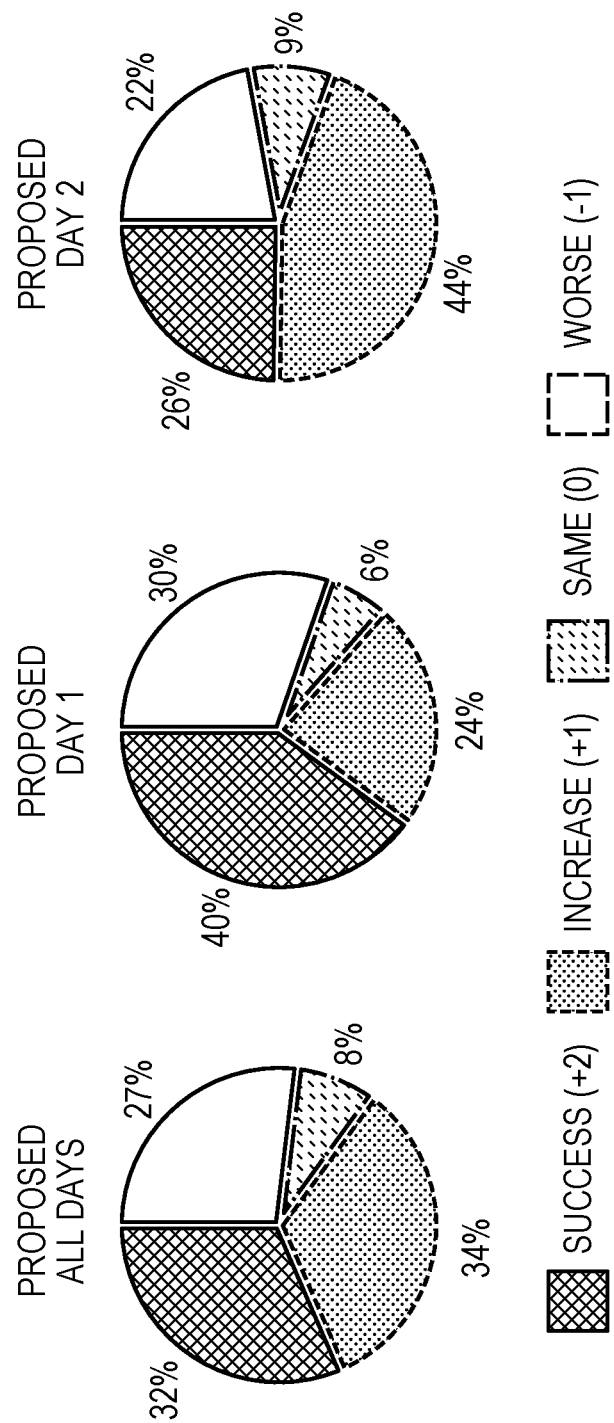
FIG. 14 is a chart illustrating reward distribution in one embodiment.

FIG. 14 illustrates reward distribution of different approaches including the example embodiment.

Adversarial Action Evaluation

The Adversarial Action Evaluation analyzes the case where a jammer transmits random waveforms that generate interference with those generated by the transmitter. In this case, the example DRL agent model may be trained in the low-mid MLA case described above and then tested in this adversarial environment. This use-case is particularly relevant as it shows how different waveform synthesis solutions perform over completely new and previously unseen channel conditions.

Figure 15:
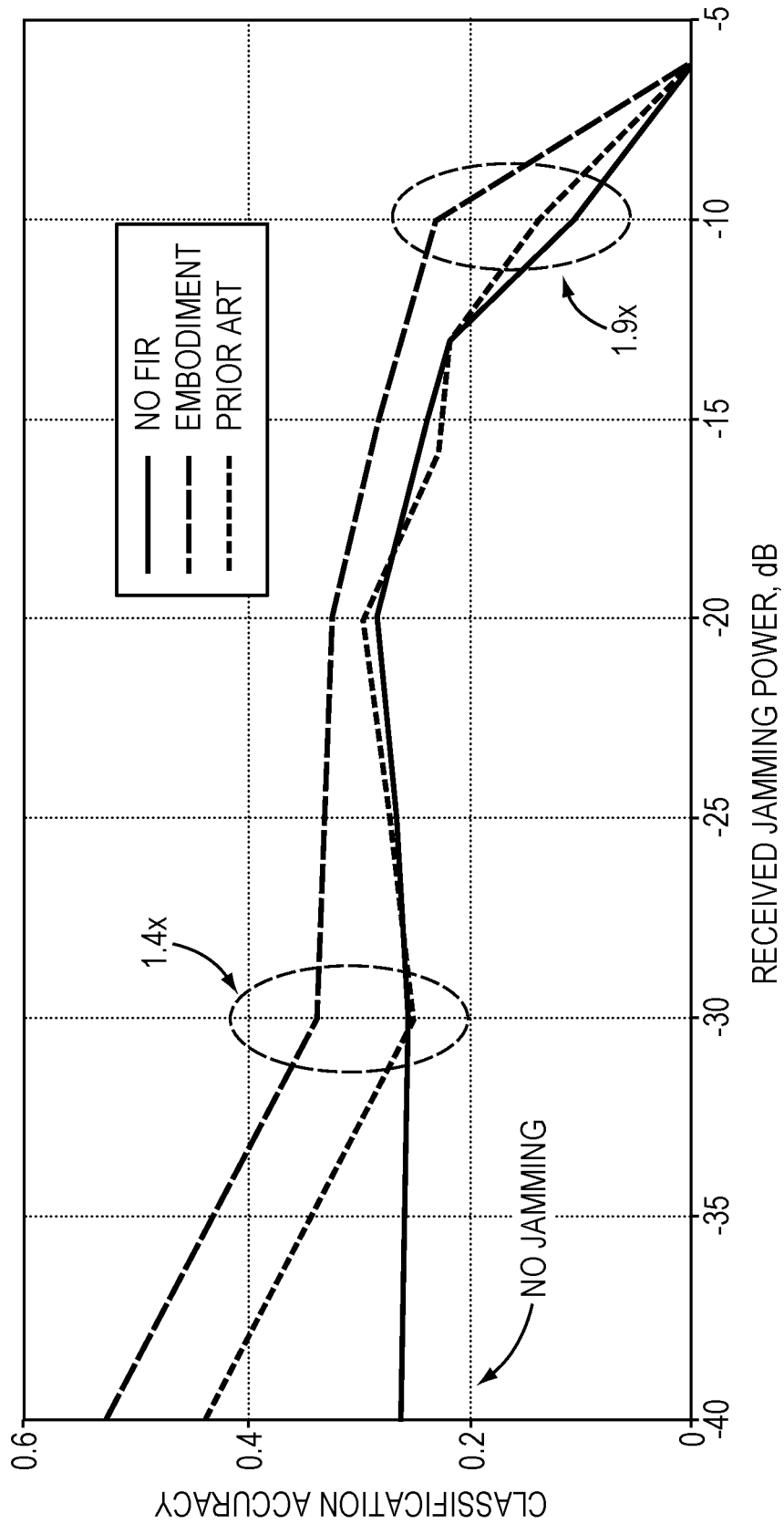
FIG. 15 is a graph illustrating classification accuracy in the case of an adversarial attack in one embodiment.

FIG. 15 is a graph illustrating the average classification accuracy of the three modulations for different solutions and received jamming power. In all cases, the example embodiment outperforms both the prior art approach and the case with no FIR filtering, by providing up to 1.9 accuracy increase when the jamming power is high, demonstrating how real-time and adaptive waveform synthesis effectively outperform offline and baseline approaches.

It is beneficial to assess whether the example embodiment can truly operate within typical coherence channel times. For this analysis, the actor network of the example embodiment may be synthesized in a field-programmable gate array (FPGA) device. In one example, the synthesized embodiment yields a latency of 13614 clock cycles with minimum clock period 3 μs, which corresponds to 40.842 μs. As typical coherence channels are in the order of tens of milliseconds, the example embodiment can fully keep up with realistic channel dynamics.

The teachings of all patents, published applications and references cited herein by way of the attached manuscript are incorporated by reference in their entirety. While example embodiments have been particularly shown and described, it will be understood by those skilled in the art that various changes in form and details may be made therein without departing from the scope of the embodiments contemplated herein and described in further detail in the attached manuscript.

What is claimed is:

1. A communications device, comprising:
    a transmitter configured to generate a physical layer signal to be transmitted across a communications channel;
    a physical signal modifier configured to modify the physical layer signal prior to transmission as a function of a first set of signal modification parameters to produce a modified physical layer signal;
    a machine learning (ML) agent configured to:
        parse a feedback signal from a receiver across the communications channel, the feedback signal being a function of the modified physical layer signal;
        determine a present tuning status, the present tuning status being a function of 1) the first set of signal modification parameters and 2) the feedback signal;
        generate a second set of signal modification parameters based on the present tuning status and a set of stored tuning statuses; and update the physical signal modifier to implement the second set of signal modification parameters to produce a subsequent modified physical layer signal to be transmitted across the communications channel.

2. The device of claim 1, wherein the physical signal modifier is a finite impulse response (FIR) filter configured to modify the physical layer signal by modifying a set of FIR taps.

3. The device of claim 1, wherein the ML agent is configured to parse the feedback signal to determine a predicted class or a softmax of the modified physical layer signal output by a signal classifier at the receiver.

4. The device of claim 3, wherein the predicted class identifies at least one of the following characteristics of the modified physical layer signal: communications protocol, modulation format, frequency band, communications technology, and encryption scheme.

5. The device of claim 1, wherein the ML agent is configured to parse the feedback signal to determine a predicted modulation class or a predicted radio frequency (RF) fingerprint of the modified physical layer signal output by a signal classifier at the receiver.

6. The device of claim 1, wherein the ML agent is configured to parse the feedback signal to determine an error rate output by the receiver, the error rate indicating a rate of error in decoding the modified physical layer signal.

7. The device of claim 1, wherein the ML agent is configured to generate the second set of signal modification parameters absent an indication of model parameters or weight values implemented by a signal classifier at the receiver.

8. The device of claim 1, wherein the ML agent is a twin delayed deep deterministic policy gradients (TD3) learning agent.

9. The device of claim 1, wherein the ML agent is configured to generate at least some of the stored tuning statuses via a training process, the ML agent being configured to incorporate a noise signal into the physical layer signal during the training process.

10. The device of claim 1, wherein the ML agent is further configured to:
determine a subsequent tuning status, the subsequent tuning status indicating the second set of signal modification parameters; and
update the stored statuses to include the subsequent tuning status.

11. The device of claim 1, wherein the tuning status is a tuple including values representing the first set of signal modification parameters and the feedback signal.

12. The device of claim 1, wherein the feedback signal identifies the transmitter based on a signature evident in a received physical layer signal, the signature being associated with hardware of the transmitter.

13. The device of claim 12, wherein the physical signal modifier is configured to modify the physical layer signal in a manner emphasizing the signature relative to the signature evident in the physical layer signal.

14. The device of claim 12, wherein the signature is a property of the physical layer signal emergent from one or more imperfections of the hardware of the transmitter device.

15. The device of claim 1, wherein the communications channel is at least one of a wireless channel, a wired channel, a fiber optic channel, a free space optical channel, and a fluidic channel.

16. The device of claim 1, wherein the ML agent is a deep reinforcement learning (DRL) agent.

17. A method of communication, comprising:
generating a physical layer signal to be transmitted across a communications channel;
modifying the physical layer signal prior to transmission as a function of a first set of signal modification parameters to produce a modified physical layer signal;
parsing a feedback signal from a receiver across the communications channel, the feedback signal being a function of the modified physical layer signal;
determining a present tuning status, the present tuning status being a function of 1) the first set of signal modification parameters and 2) the feedback signal;
generating a second set of signal modification parameters based on the present tuning status and a set of stored tuning statuses; and
updating a physical signal modifier to implement the second set of signal modification parameters to produce a subsequent modified physical layer signal to be transmitted across the communications channel.

18. The method of claim 17, wherein the physical signal modifier is a finite impulse response (FIR) filter configured to modify the physical layer signal by modifying a set of FIR taps.

19. The method of claim 18, wherein the communications channel is at least one of a wireless channel, a wired channel, a fiber optic channel, a free space optical channel, and a fluidic channel.

20. The method of claim 18, wherein generating the second set of signal modification parameters is via a deep reinforcement learning (DRL) agent.

21. The method of claim 17, wherein the feedback signal is based on a predicted class or a softmax of the modified physical layer signal output by a signal classifier at the receiver.

22. The method of claim 21, wherein the predicted class identifies at least one of the following characteristics of the modified physical layer signal: communications protocol, modulation format, frequency band, communications technology, and encryption scheme.

23. The method of claim 17, wherein the feedback signal is based on a predicted modulation class or a predicted radio frequency (RF) fingerprint of the modified physical layer signal output by a signal classifier at the receiver.

24. The method of claim 17, wherein the feedback signal is based on an error rate output by the receiver, the error rate indicating a rate of error in decoding the modified physical layer signal.

25. The method of claim 17, further comprising generating the second set of signal modification parameters absent an indication of model parameters or weight values implemented by a signal classifier at the receiver.

26. The method of claim 17, wherein generating the second set of signal modification parameters is via a twin delayed deep deterministic policy gradients (TD3) learning agent.

27. The method of claim 17, further comprising:
generating at least some of the stored tuning statuses via a training process; and
incorporating a noise signal into the physical layer signal during the training process.

28. The method of claim 17, further comprising:
determining a subsequent tuning status, the subsequent tuning status indicating the second set of signal modification parameters; and
updating the stored statuses to include the subsequent tuning status.

29. The method of claim 17, wherein the tuning status is a tuple including values representing the first set of signal modification parameters and the feedback signal.

30. The method of claim 17, wherein the feedback signal identifies the transmitter based on a signature evident in a received physical layer signal, the signature being associated with hardware of the transmitter.

31. The method of claim 30, further comprising modifying the physical layer signal in a manner emphasizing the signature relative to the signature evident in the physical layer signal.

32. The method of claim 30, wherein the signature is a property of the physical layer signal emergent from one or more imperfections of the hardware of the transmitter device.

* * * * *